United States Patent [19]

Sugita et al.

[11] Patent Number: 5,862,172
[45] Date of Patent: Jan. 19, 1999

[54] SPREAD SPECTRUM COMMUNICATION SYSTEM AND ITS TRANSMITTER AND RECEIVER

[75] Inventors: Takehiro Sugita, Kanagawa; Junichi Nakata, Tokyo, both of Japan

[73] Assignee: Sony Corporation, Tokyo, Japan

[21] Appl. No.: 616,096

[22] Filed: Mar. 14, 1996

[30] Foreign Application Priority Data

Mar. 17, 1995 [JP] Japan .................................. 7-086018

[51] Int. Cl.⁶ .................................................. H04B 1/69
[52] U.S. Cl. .......................... 375/200; 375/208; 375/367; 370/335; 370/441
[58] Field of Search .................................. 375/200, 206, 375/207, 208, 253, 367, 355, 295, 316, 354; 370/479, 320, 335, 342, 350, 441

[56] References Cited

U.S. PATENT DOCUMENTS

| 5,003,552 | 3/1991 | Mower ..................................... 375/367 |
| 5,301,206 | 4/1994 | Ishigaki .................................. 375/200 |
| 5,375,141 | 12/1994 | Takahashi ............................... 375/200 |
| 5,495,509 | 2/1996 | Lundquist et al. ...................... 375/367 |
| 5,572,514 | 11/1996 | Miyake ................................... 370/248 |
| 5,583,884 | 12/1996 | Maruyama et al. .................... 375/207 |
| 5,619,527 | 4/1997 | Kuroyanagi et al. .................. 375/206 |

*Primary Examiner*—Huy D. Vu
*Assistant Examiner*—Congvan Tran
*Attorney, Agent, or Firm*—Jay H. Maioli

[57] ABSTRACT

A spread spectrum communication system, which can detect the synchronization of the spread code surely even when the carrier-to-noise ratio is low, and can detect the boundary of the data. Wherein two types of spread code S20, S21 are transmitted from a transmitter 21 as an initial synchronizing signal based on a predetermined transmission pattern, and two types of spread code are respectively detected at a receiver 22. The predetermined transmission pattern is detected based on the detected two spread codes. Therefore, the spread code is detected several times at the receiver, and the synchronization of the spread code can be detected surely even when the carrier-to-noise ratio is low. Further, the boundary of the data can be detected by the predetermined transmission pattern.

20 Claims, 18 Drawing Sheets

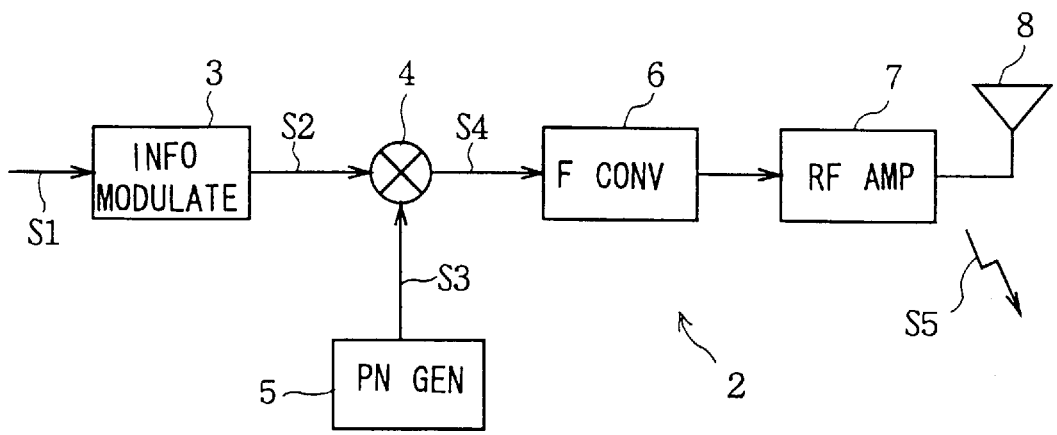
FIG. IA (RELATED ART)
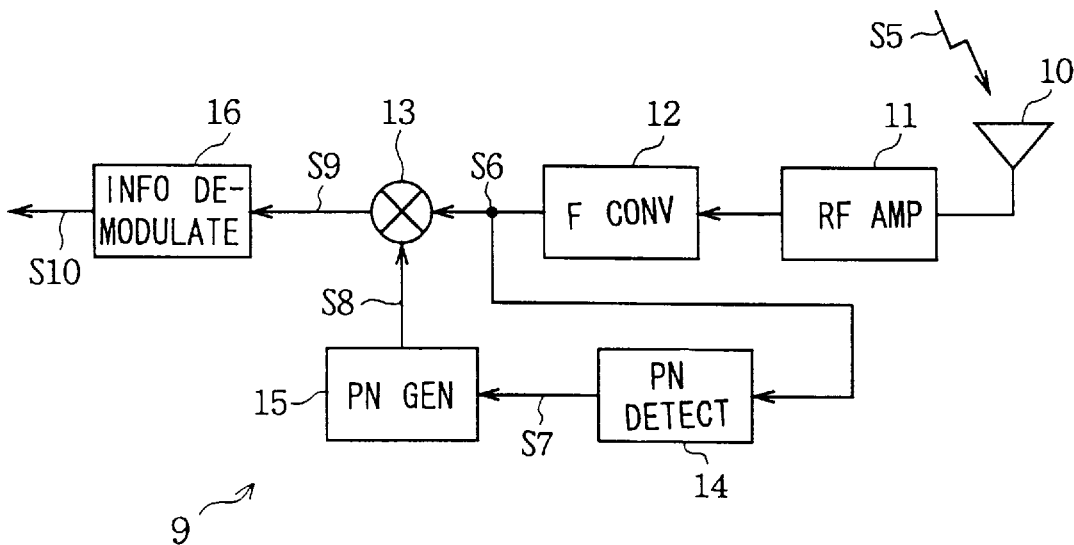
FIG. IB (RELATED ART)

| PN | PN | PN | PN | PN | DATA |

FIG. 2 (RELATED ART)

| TIME | CONDITION OF REGISTORS | | |
|---|---|---|---|
| | REGISTOR 42A | REGISTOR 42B | REGISTOR 42C |
| 0 | 0 | 0 | 1 |
| 1 | 1 | 1 | 0 |
| 2 | 0 | 1 | 1 |
| 3 | 1 | 1 | 1 |
| 4 | 1 | 0 | 1 |
| 5 | 1 | 0 | 0 |
| 6 | 0 | 1 | 0 |

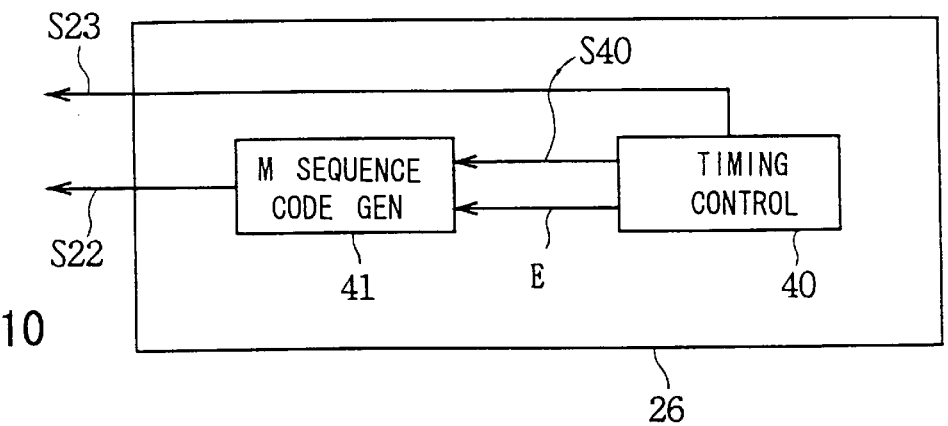
FIG. 10
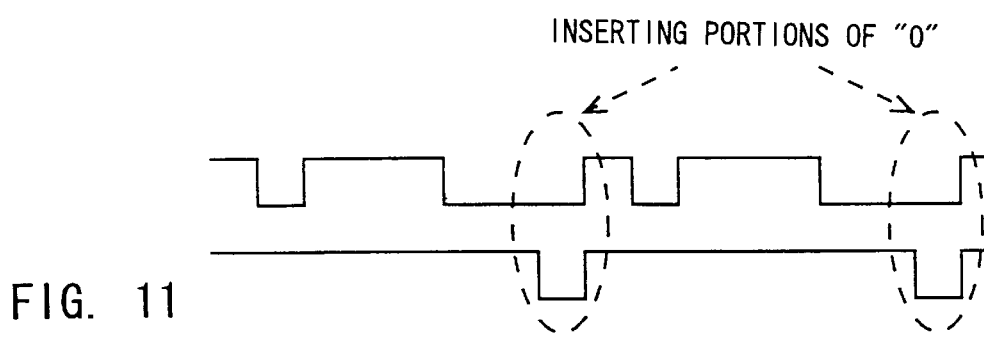
FIG. 11
FIG. 12
| TIME | CONDITION OF REGISTERS | | |
|---|---|---|---|
| | REGISTER 42A | REGISTER 42B | REGISTER 42C |
| 0 | 0 | 0 | 1 |
| 1 | 1 | 1 | 0 |
| 2 | 0 | 1 | 1 |
| 3 | 1 | 1 | 1 |
| 4 | 1 | 0 | 1 |
| 5 | 1 | 0 | 0 |
| 6 | 0 | 1 | 0 |
| 7 | 0 | 1 | 0 |
← INSERTING PORTIONS OF "0"

SPREAD SPECTRUM COMMUNICATION SYSTEM AND ITS TRANSMITTER AND RECEIVER

BACKGROUND OF THE INVENTION

1. Field of the Invention

This invention relates to a spread spectrum communication system, and its receiver and transmitter, and more particularly, is suitable to a portable telephone device, etc. of a spread spectrum communication method.

2. Description of the Related Art

Heretofore, in a spread spectrum communication system, the Pseudo Noise code (PN code) transmitted from a transmitter is detected by a receiver, so that the PN code used for the spread spectrum is synchronous between the transmitter and the receiver.

Here, such a spread spectrum communication system will be described with reference to FIG. 1.

As shown in FIG. 1, in a transmitter 2 of the spread spectrum communication system 1, information data S1 as a transmission data is inputted to an information modulating part 3. The information modulating part 3 performs the primary modulation such as the frequency modulation or the phase modulation on a predetermined carrier wave by using the information data S1. The obtained transmitting signal S2 is outputted to a multiplier 4. PN code S3 generated at a PN code generator 5 has been inputted in the multiplier 4, and the multiplier 4 multiplies the transmitting signal S2 by the PN code S3 so as to spread the spectrum of the transmitting signal S2.

The transmitting signal S4 which is a spread spectrum signal is inputted to a frequency converting part 6 where it is frequency-converted into a signal having a high frequency, and then it is amplified by a radio frequency (RF) amplifying part 7 to be irradiated through an antenna 8 as a transmitting signal S5.

Meanwhile, in a receiver 9, the transmitting signal S5 transmitted from the transmitter 2 is received at an antenna 10, and is inputted to a RF amplifying part 11. The RF amplifying part 11 amplifies the receiving signal to output it to a frequency converting part 12. The frequency converting part 12 frequency-converts the receiving signal of a high frequency into the receiving signal S6 of a low frequency to output it to a multiplier 13 and a PN detecting part 14.

The PN detecting part 14 detects the PN code from the receiving signal S6, and outputs timing signal S7 for initializing the PN code to a PN generator 15. The PN generator 15 generates PN code S8 at a proper timing based on the timing signal S7 to output it to the multiplier 13. The PN code S8 is multiplied by the receiving signal S6 by the multiplier 13, so that the spread spectrum receiving signal S6 is inverse-spread. The inverse-spread receiving signal S9 is inputted to an information demodulating part 16 where it is demodulated by performing the reverse processing to that done in the information modulating part 3 at a transmission side and is outputted as an information data S10.

In the spread spectrum communication system 1, generally, if the spread rate is made high, the jamming-resistance is improved, and it makes it possible to communicate surely even when a carrier-to-noise ratio C/N is low. However, if the spread ratio is made high, the length of PN code used in PN code detection at a reception side (referred to as detection code length. Note that the detection code length does not always correspond to the period of PN code.) becomes long.

However, if the detection code length is lengthened, the construction of the matched filter becomes complicated as in the case of using a matched filter as the PN detecting part 14, and there occurs the necessity of a standard oscillator of high accuracy. On the contrary, if the detection code length is shortened, the PN code can not be detected at a reception side when the carrier-to-noise ratio C/N is low, and there occurs the problem that the detection accuracy (i.e., reliability) becomes low.

As a method for solving the problems, there is a method for realizing the improvement of detection accuracy, the simplification of circuit construction, and the relief of frequency accuracy, by transmitting repeatedly the comparatively short PN code before the data transmission, and detecting the PN code several times at a reception side.

Here, as shown in FIG. 2, the case where the PN code is transmitted five times repeatedly before the data transmission will be explained based on the above method. In this case, the opportunities of detecting PN code exists five times at a reception side, and it is assumed that the synchronization of PN code can be detected if two detections can be performed among five opportunities of detection. As a case corresponding to this condition, there are two cases for example, one is the case where first and second PN codes are detected and the rest of the codes are not detected, and other is the case where second and third PN codes are detected and the rest of the codes are not detected.

In both cases, since the PN detecting part can not know where does the detected PN code ranks, it can not be specified how far the head of the data is apart from the start point of the detection. Therefore, the start code representing the head of the data is needed to be inputted in the data in this method. In this way, this method can solve the above problem, but the redundant code which is the start code is needed to be added and there still have a insufficient point as a solution.

SUMMARY OF THE INVENTION

In view of the foregoing, an object of this invention is to provide a spread spectrum communication system and its transmitter and receiver which can surely detect the synchronization of the spread code even if the carrier-to-noise ratio is low, and simultaneously can detect the boundary of the data.

The foregoing object and other objects of the invention have been achieved by the provision of a spread spectrum communication system and its transmitter and receiver in which two types of spread code are transmitted from the transmitter based on a transmission pattern as an initial synchronizing signal, and two types of spread code are respectively detected at the receiver to detect the predetermined transmission pattern based on the detected two types of spread code.

Further, according to this invention, the first spread code is generated by the transmitter, and the second spread code is generated for each first regular period of the first spread code. The transmission data is spread by using the first and second spread codes to be transmitted. The same first spread code as that of transmission side is generated as an inverse-spread code by the receiver, and the second spread code is generated. The correlation of first and second spread codes are respectively detected to inverse-spread the receiving signal.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 is a block diagram showing the construction of the conventional spread spectrum communication system;

Figure 2:
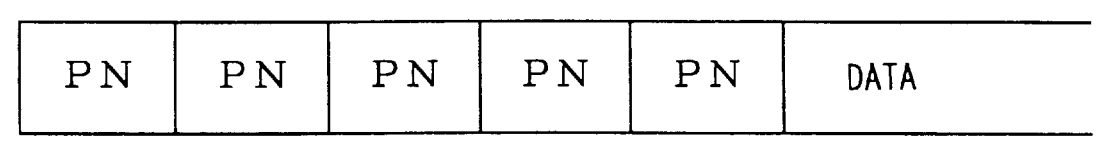

FIG. 2 is a schematic diagram showing the transmission format of the conventional spread spectrum communication system;

FIG. 10 is a block diagram showing the construction of the controlling part in the case where one "0" is added and inserted to the M sequence code;

FIG. 11 is a signal waveform diagram showing the enable signal in the case where one "0" is added and inserted to the M sequence code;

FIG. 12 is a table showing the condition of each register of the M sequence code generator in the case where one 0" is added and inserted to the M sequence code;

DETAILED DESCRIPTION OF THE EMBODIMENT

Preferred embodiments of this invention will be described with reference to the accompanying drawings:

(1) Spread Spectrum Communication System Performing Spreading after Information Modulation First, the spread spectrum communication system for performing the information modulation on the data to be transmitted, thereafter, performing the spread spectrum on them will be described.

(1-1) First Embodiment (1-1-1) Whole Construction

Figure 3A:
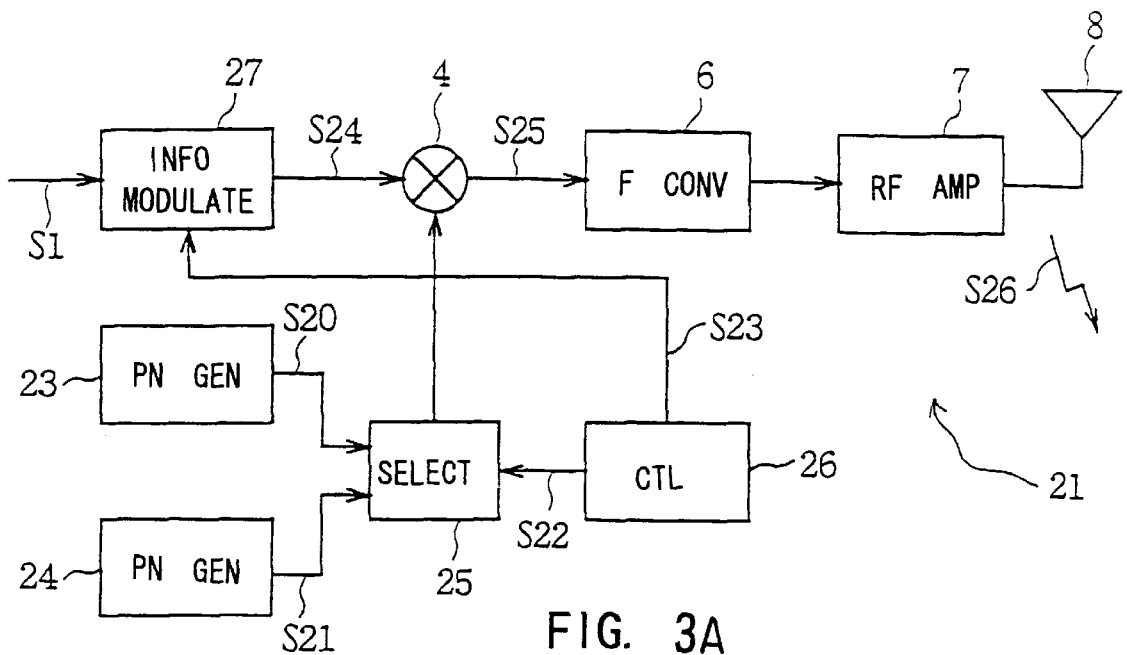
FIG. 3 is a block diagram showing the construction of a spread spectrum communication system according to an embodiment of this invention.
Figure 3B:
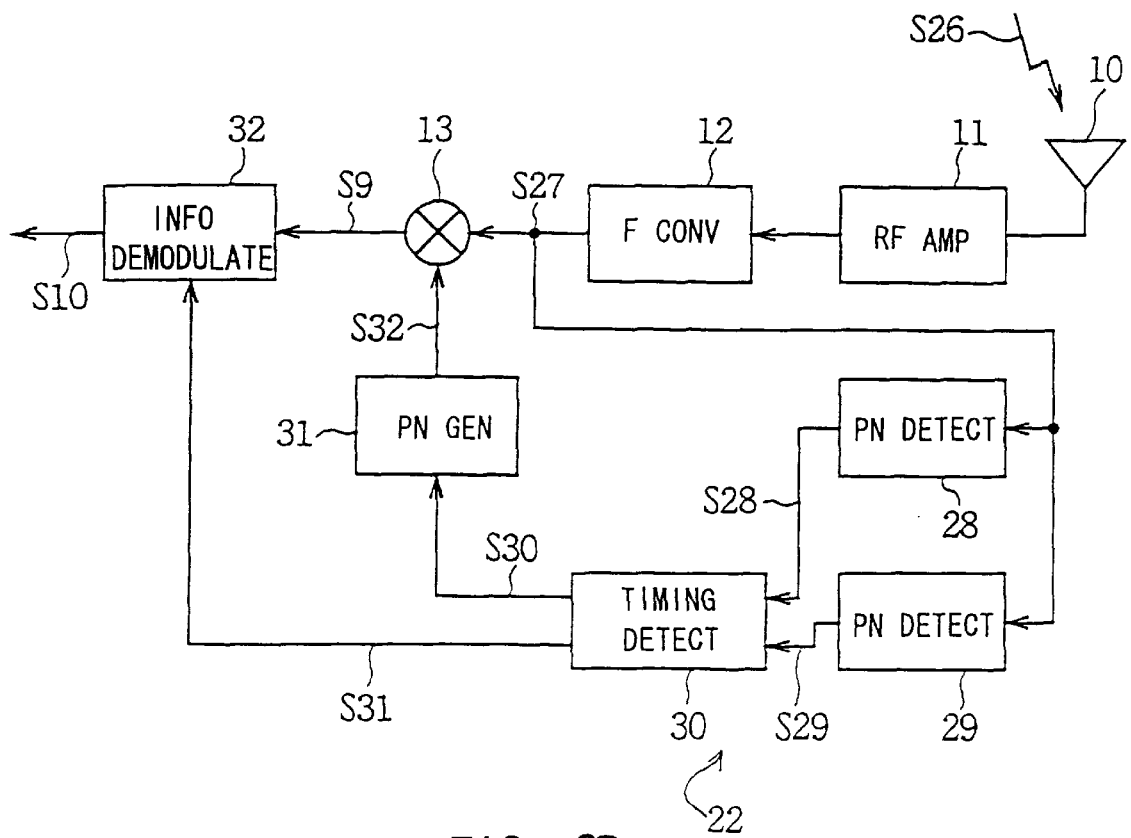

Referring to FIG. 3 in which the portions corresponding to those of FIG. 1 are designated with the same symbols, 20 shows a spread spectrum communication system as a whole, which communicates between a transmitter 21 and a receiver 22 using a spread spectrum communication method.

Figure 4:
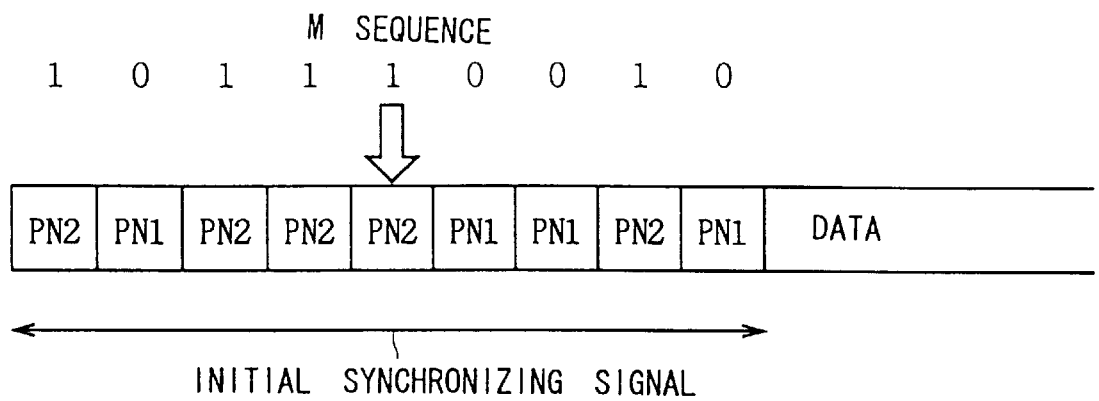
FIG. 4 is a schematic diagram showing the transmission format in the spread spectrum communication system.

In the spread spectrum communication system 20, the transmitter 21 transmits two types of PN code having a relatively short period as an initial synchronizing signal in accordance with a predetermined pattern, before the data transmission. For example, as shown in FIG. 4, corresponding to the maximum length linear shift resister sequence code (M sequence code) of degree three, a first PN code is transmitted when the code value is "0" and a second PN code is transmitted when the code value is "1". The receiver 22 detects two types of PN code from the initial synchronizing signal and its order (i.e., the above predetermined pattern), so that the timing of initialization of PN code for inverse-spreading is detected and the timing of the start of the data is specified. That is, the synchronization of PN code is detected, and the boundary of the data is detected.

Here, the spread spectrum communication system 20 will be concretely explained with reference to FIG. 3.

In the transmitter 21, the first PN code S20 is generated at a PN generator 23, and the second PN code S21 is generated at a PN generator 24. Two PN codes S20, S21 are inputted to a selecting part 25, where they are selected based on a selection controlling signal S22 from a controlling part 26 to be supplied to a multiplier 4.

The transmitter 21 transmits the initial synchronizing signal based on the above principle, before the data transmission. In this case, the controlling part 26 outputs a controlling signal S23 to stop the modulating operation of an information modulating part 27. Therefore, the information modulating part 27 outputs a signal which is not modulated by an information data S1, that is, a transmitting signal S24 which is simply composed of carrier wave, to the multiplier 4.

In addition, the information modulating part 27 has the buffering function and can perform buffering on the information data S1 during the period until the start of the modulating operation (that is, until the initial synchronizing signal has been transmitted.).

Also, the controlling part 26 generates the M sequence code inside, and outputs the M sequence code to the selecting part 25 as a selection controlling signal S22. The selecting part 25 selects the first PN code S20 for one period when the selection controlling signal S22 is "0" for example, and selects the second PN code S21 for one period when the selection controlling signal S22 is "1". Thereby, the first and second PN codes S20, S21 are supplied to the multiplier 4 in the order in accordance with the M sequence code.

The multiplier 4 multiplies the transmitting signal S24 which is not modulated by the information data S1 by the first and second PN codes in the order in accordance with the M sequence code. The transmitting signal S25 obtained by the multiplying is inputted to a frequency converting part 6, where it is converted into the signal of high frequency, thereafter, amplified by a RF amplifying part 7 to be radiated through an antenna 8 as a transmitting signal S26.

In this way, a transmitting signal S24 which is not modulated by the information data S1 is multiplied by the first and second PN codes S20, S21, so that the transmitter 21 transmits the first and second PN codes S20, S21 as an initial synchronizing signal.

The transmitter 21 transmits the first and second PN codes S20, S21 by the predetermined number of times, and then transmits the information data S1. In this case, the controlling part 26 outputs the controlling signal S23 to start the modulating operation of the information modulating part 27. Thereby, the information modulating part 27 performs the primary modulation such as the frequency modulation and the phase modulation on the predetermined carrier wave by using the inputted information data S1, and outputs the obtained transmitting signal S24 to the multiplier 4.

Also, the controlling part 26 outputs the selection controlling signal S22 being either of the values "0" or "1" to the selecting part 25. Therefore, the selecting part 25 selects either of the first PN code S20 or the second PN code S21 based on the selection controlling signal S22, and outputs it to the multiplier 4 as a PN code for data spreading. The multiplier 4 multiplies the transmitting signal S24 and the PN code for data spreading. The transmitting signal S25 obtained by the multiplication is inputted to the frequency converting part 6 similarly, and is converted into a signal of high frequency, thereafter, amplified by the RF amplifying part 7 to be radiated through the antenna 8 as a transmitting signal S26.

In this way, the transmitting signal S24 which is not modulated by the information data S1 is multiplied first by the first and second PN codes of the order in accordance with the M sequence code, and then the transmitting signal S24 which is modulated by the information data S1 is multiplied by either of the first PN code S20 or the second PN code S21, so that the transmitter 21 transmits them with a format shown in FIG. 4.

On the contrary, in the receiver 22, the transmitting signal S26 transmitted from the transmitter 21 is received by an antenna 10, and it is inputted to a RF amplifying part 11 as a receiving signal. The RF amplifying part 11 amplifies the receiving signal to output it to a frequency converting part 12. The frequency converting part 12 frequency-converts the receiving signal of high frequency into the receiving signal S27 of low frequency to output it to a multiplier 13 and PN detecting parts 28, 29.

Here, in the receiver 22, the PN detecting parts 28, 29 detect the first and second PN codes S20, S21 from the initial synchronizing signal portion in the receiving signal S27. In this case, the PN detecting part 28 detects the first PN code S20 to output the detected signal S28 to a timing detecting part 30. The PN detecting part 29 detects the second PN code S21 to output the detected signal S29 to the timing detecting part 30.

The timing detecting part 30 specifies the timing of initialization of the PN code for inverse-spreading from the time interval, order, and the intensity of the detected signals S28, S29 to output the initializing signal S30 to a PN generator 31, and at the same time, specifies the data start timing to output the demodulation start timing signal S31 to an information demodulating part 32.

The PN generator 31 is initialized by the initializing signal S30, and generates the PN code for inverse-spreading S32 at a proper timing so as to be the correlative, to output it to the multiplier 13. Thus, the receiving signal S27 and the PN code for inverse-spreading S32 are multiplied at the multiplier 13, so that the receiving signal S27 that has been spread is inversely spread. The obtained inverse-spreading signal S9 is inputted to the information demodulating part 32.

The information demodulating part 32 operates based on the demodulation start timing signal S31, and the inverse-spreading signal S9 is demodulated by performing inverse processing to the information modulating part 27 at a transmission side to obtain information data S10.

In this way, the first and second PN codes S20, S21 are detected from the initial synchronizing signal by the PN detecting parts 28, 29, the timing of initialization of the PN code for inverse-spreading S32 based on the detected result (that is, the detected signals S28, S29), and the data start timing is specified, so that the receiver 22 performs the inverse-spreading on the receiving signal S27, which has been performed the spread spectrum, to demodulate.

(1-1-2) Construction of Controlling Part

Figure 5:
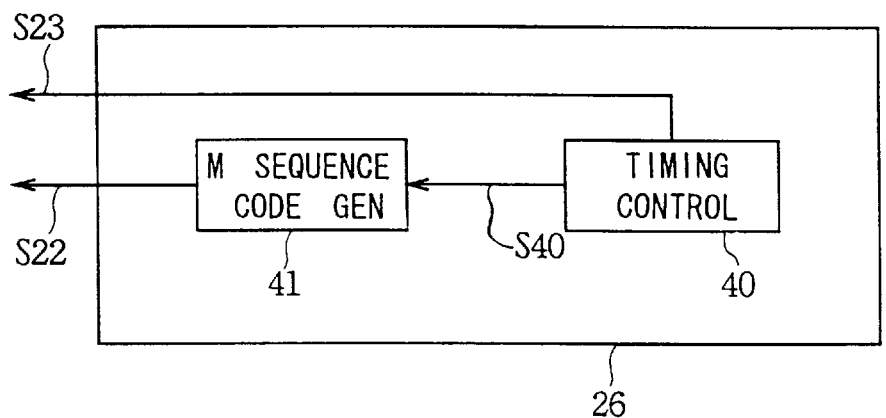
FIG. 5 is a block diagram showing the construction of a controlling part.

Here, as shown in FIG. 5, the controlling part 26 provided in the transmitter 21 consists of a timing control circuit 40 and an M sequence code generator 41.

First, when the initial synchronizing signal is transmitted, the timing control circuit 40 outputs the controlling signal S23 to the information modulating part 27 to stop the modulating operation of the information modulating part 27. Thereby, the transmitting signal S24 which is not modulated by the information data S1 is output from the information modulating part 27.

Also, the timing control circuit 40 outputs the initializing signal S40 to the M sequence code generator 41 to initialize the M sequence code generator 41. Thereby, the M sequence code generator 41 generates the M sequence code at this timing, and outputs the M sequence code to the selecting part 25 as a selection controlling signal S22. Thus, the selecting part 25 selects the first and second PN codes S20, S21 in accordance with the selection controlling signal S22, so as to output the initial synchronizing signal of a format shown in FIG. 4.

In this way, if the first and second PN codes S20, S21 are transmitted the predetermined number of times as an initial synchronizing signal, the timing control circuit 40 outputs the controlling signal S23 to the information modulating part 27 to start the modulating operation of the information modulating part 27. Moreover, the timing control circuit 40 stops the operation of the M sequence code generator 41 by using the initializing signal S40, and outputs the selection controlling signal S22 being the value "0" or "1" from the M sequence code generator 41. Therefore, the transmitting signal S24 which is modulated by the information data S1 is outputted from the information modulating part 27, and the transmitting signal S24 is spread by the first or second PN codes S20, S21, thereafter transmitted.

Figures 6, 7:
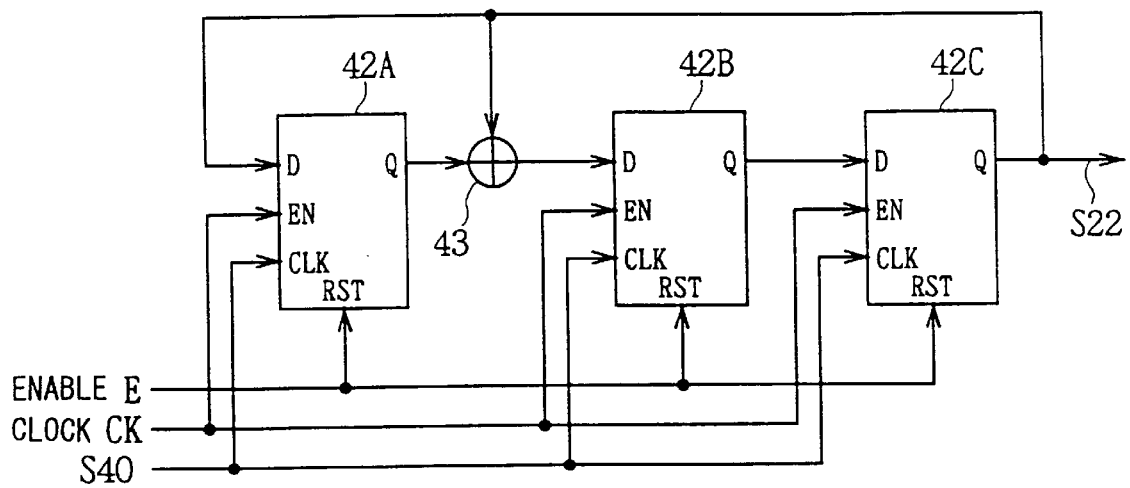
FIG. 6 is a block diagram showing the construction of an M sequence code generator.
FIG. 7 is a table showing the condition of each register of the M sequence code generator.

Here, the M sequence code generator 41 will be explained. In this embodiment, the M sequence code generator 41 which generates the M sequence code of degree three, as shown in FIG. 6, is composed of three registers 42A to 42C and an adder 43. However, in this embodiment, by making an enable signal E to be a condition of normal level "H", respective registers 42A to 42C are normally in the enable condition.

In the M sequence code generator 41, the condition of respective registers 42A to 42C at each time are shown in FIG. 7, and it is apparent from FIG. 7 that the period of M sequence code becomes "7" if the degree is three.

In the M sequence code, there is a characteristic that the continuous code sequence to the number of N appears only one time in one period, when the degree is N. For example, as shown in FIG. 7, in the M sequence code of degree three, the continuous three code sequence "1, 0, 1" exists only one time in one period. Therefore, utilizing the characteristic, it can be known that if two types of PN code are transmitted ($2^N$+N−2) times at its maximum corresponding to the code values of M sequence code "0", "1", and if the two types of PN code are detected N times continuously to detect its order, the timing of the head of data continuing after two types of PN code (that is, the boundary between the PN code and data) can be specified.

In the case where the degree of M sequence code is three as described above, two types of PN code of a maximum number of nine are transmitted in accordance with the M sequence code, and two types of PN code are detected three times continuously at a reception side, so that the timing of the head of the data can be specified from the order of the detected two types of PN code.

For this reason, in the embodiment, the first and second PN codes S20, S21 are transmitted with a format shown in FIG. 4 as an initial synchronizing signal.

(1-1-3) Construction of Timing Detecting Part

Figure 8:
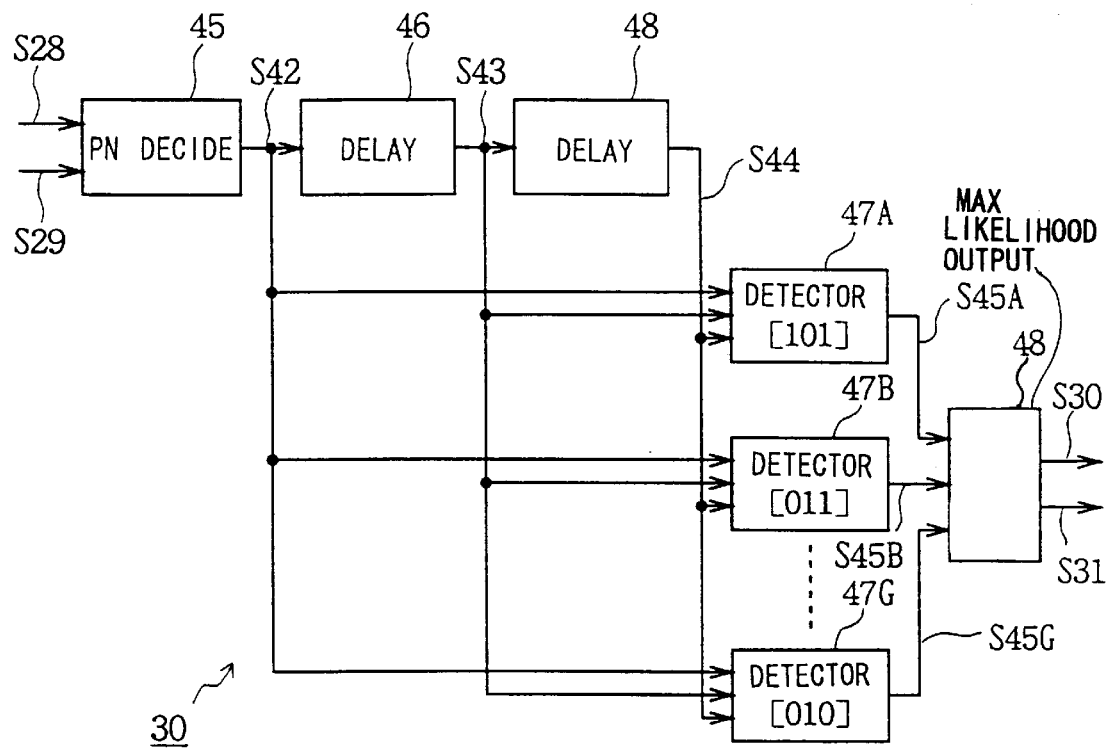
FIG. 8 is a block diagram showing the construction of a timing detecting part.

Here, as shown in FIG. 8, in the timing detecting part 30 provided in the receiver 22, the detected signals S28, S29 outputted from the PN detecting parts 28, 29 are inputted to a PN deciding unit 45.

The PN deciding unit 45 detects three conditions, based on two detected signals S28, S29, where the three conditions are the detection of first PN code S20, the detection of second PN code S21, and the non-detection of both of the PN codes S20, S21. The detected result is outputted to a delay circuit 46 and detectors 47A to 47G as a detected signal S42. In this case, the PN deciding unit 45 decides that if both of the two detected signals S28, S29 are under the predetermined threshold value, it is the non-detection state, and decides that if they are over the predetermined threshold value, the signal having the stronger intensity is detected.

In that connection, actually the PN deciding unit 45 decides as described above by using the correlation value obtained from the detected signals S28, S29, and the correlation value is outputted as the detected signal S42.

The delay circuit 46 delays the detected signal S42 for one period of PN code, and outputs the obtained detected signal S43 to a delay circuit 48 and the detectors 47A to 47G. The delay circuit 48 also delays the detected signal S43 for one period of PN code, and outputs the obtained detected signal S44 to the detectors 47A to 47G. In this case, the delay time of the delay circuits 46, 48 is one period of PN code, so that the detected signals S42, S43, and S44 represent the detected result of PN code for continuous three times.

The detectors 47A to 47G decides which portion of the initial synchronizing signal shown in FIG. 4 is detected based on the detected result of PN code for continuous three times (that is, the detected signals S42, S43, and S44). Thus, in the detectors 47A to 47G, the detectors to the number of ($2^N$−1) are needed at its maximum when the degree of M sequence code is N, and seven detectors 47A to 47G are needed in three degree as in this embodiment.

The detector 47A detects whether or not the signal being received corresponds to the first three PN codes portion of initial synchronizing signal in FIG. 4 (that is, whether or not it corresponds to the portion of the second PN code S21, the first PN code S20, and the second PN code S21) by using the detected signal S42, S43, and S44, and outputs the detected result to a maximum likelihood output circuit 48 as a detected signal S45A.

Similarly, the detector 47B detects whether or not the signal being received corresponds to the next three PN codes portion (that is, whether or not it corresponds to the portion of the first PN code S20, the second PN code S21, the second PN code S21) by using the detected signal S42, S43, and S44, and outputs the detected result to the maximum likelihood output circuit 48 as a detected signal S45B. Then, in the similar way, the detectors 47C to 47G also detect whether or not the signal being received corresponds to the respective three PN codes portion by using the detected signals S42, S43, and S44, and outputs the detected result to the maximum likelihood output circuit 48 as detected signal S45C to S45G.

The maximum likelihood output circuit 48 specifies the most reliable initialization timing of the PN code and the data start timing based on the detected signals S45A to S45G which have been inputted, and generates the initializing signal S30 and the demodulation start timing signal S31 to output them.

In addition, in this embodiment, actually the respective detectors 47A to 47G output the correlation values as the detected signals S45A to S45G. Thereby, the maximum likelihood output circuit 48 compares the intensity of the correlation values obtained from the detected signals S45A to S45G, and regards the value having the strongest correlation as a reliable timing. More specifically, the maximum likelihood output circuit 48 uses the value having the strongest correlation to judge the position of the signal being received at present, and specifies the data start timing and the initialization timing of PN code by calculating backward from the judged position.

In this way, the timing detecting part 30 detects whether the signal being received at present is the first PN code S20, or the second PN code S21, based on the detected signals S28, S29, and uses the detected signal S42 obtained next as the detected result and uses the detected signals S43, S44 that the detected signal S42 is delayed for one period and two period of PN code to detect that which portion does the signal being received at present correspond to. By detecting in this way, the timing detecting part 30 obtains the demodulation start timing of the information demodulating part 32 (that is, the modulation start timing signal S31), and obtains the initialization timing of PN generator 31 (that is, the initializing signal S30).

In addition, since M sequence code of degree three is used in this embodiment, it is decided which portion of the initial synchronizing signal is being detected based on the detected result of PN code for continuous three times. However, in the case where the M sequence code of degree N is used, it can be decided based on the detected result of the PN code for continuous N times.

(1-1-4) Operation and Effects of the Embodiment

With the above construction, in the case of communicating by the spread spectrum communication system 20, the transmitter 21 transmits the first and second PN codes S20, S21 in accordance with a predetermined pattern before the data transmission. In this case, the transmitter 21 generates the M sequence code of degree three as a predetermined pattern, and selects the first PN code S20 or second PN code S21 in accordance with the code value of the M sequence code to transmit it.

More specifically, in the transmitter 21, the M sequence code is generated at the controlling part 26 to output it as a selection controlling signal S22 of the selecting part 25. The selecting part 25 selects the inputted first and second PN codes S20, S21 based on the selection controlling signal S22. Thereby, two PN codes S20, S21 of the order corresponding to the M sequence code are transmitted as the initial synchronizing signal through the multiplier 4, the frequency converting part 6, the RF amplifier 7, and the antenna 8.

In addition, when the first and second PN codes S20, S21 are transmitted as the initial synchronizing signal, the controlling part 26 outputs the controlling signal S23 to stop the modulating operation of the information modulating part 27. Thus, the first and second PN codes S20, S21 being the initial synchronizing signal are transmitted without the modulation by the transmitting signal S24 outputted from the information modulating part 27.

In this way, when the initial synchronizing signal being the first and second PN codes S20, S21 have been transmitted, the controlling part 26 outputs the controlling signal S23 to start the modulating operation of the information modulating part 27, and outputs the selection controlling signal S22 to make the selecting part 25 to select either of the first PN code S20 or the second PN code S21 as a PN code for data spreading. Therefore, the information data S1 is spectrum spread by the PN code for data spreading, and is transmitted through the frequency converting part 6, the RF amplifying part 7, and the antenna 8.

Thus, the transmitter 21 performs such transmission procedure, so as to add the first and second PN codes of the order corresponding to the M sequence code to the head of information data S1, as shown in the format of FIG. 4, to be transmitted.

On the contrary, the receiver 22 receives the transmitting signal S26 transmitted from the transmitter 21 using the antenna 10, the RF amplifying part 11, and the frequency converting part 12, to obtain the receiving signal 27. First, the receiver 22 detects the first and second PN codes S20, S21 from the initial synchronizing signal portion in the receiving signal S27 by using the PN detectors 28, 29. Next, the receiver 22 specifies the initialization timing of the PN code for inverse-spreading S32 by the timing detector 30 based on the detected result, and specifies the data start timing. Therefore, the receiver 22 initializes the PN code for inverse-spreading S32 based on the timing, and starts the operation of the information demodulating part 32, so as to perform the inverse-spreading on the receiving signal S27 to demodulate the information data S10.

In this case, the timing detecting part 30 detects whether the signal being received is the first PN code S20 or the second PN code S21 based on the detected signals S28, S29 obtained from the PN detecting parts 28, 29. Next, the timing detecting part 30 obtains the detected result for three periods of PN code (that is, the detected signals S42, S43, and S44) from the detected result, and detects which portion of the initial synchronizing signal does the signal being received correspond to, by the detected result for three periods of PN code. Then, the timing detecting part 30 specifies the data start timing from the detected result of position, and specifies the initializing timing of the PN code for inverse-spreading.

At this time, the initial synchronizing signal being the first and second PN codes S20, S21 are generated in accordance with the M sequence code as described above, so that the timing detecting part 30 decides the position of the signal being received by the detected result for three periods of PN code to specify the data start timing.

In this way, in the spread spectrum communication system 20, the first and second PN codes S20, S21 are transmitted with the predetermined pattern as the initial synchronizing signal before the data transmission, detects the first and second PN codes S20, S21 by the receiver 22, and detects its order, so that the start timing of data and the initializing timing of PN code can be specified. Therefore, in the spread spectrum communication system 20, the synchronization of PN code between a transmission side and a reception side can be easily obtained.

In this case, in the spread spectrum communication system 20, only by transmitting the first and second PN codes S20, S21 having a relatively short period with the predetermined pattern, and detecting the order of the first and second PN codes S20, S21 at a reception side, the synchronization can be obtained surely to simplify the whole construction. Further, by detecting in this way, it is unnecessary to add the redundant code which is the start code at the head of the data as in the conventional system. Furthermore, the first and second PN codes are transmitted several times by the initial synchronizing signal, so as to improve the detection accuracy of the PN code.

In this way, two types of PN code having a relatively short period are transmitted several times from the transmitter 21 in accordance with the predetermined pattern, and the PN codes are received several times by the receiver 22, so that the initial synchronization can be surely detected even if the carrier-to-noise ratio C/N is low. Moreover, because of the short period of PN code, it becomes difficult to be influenced from the clock difference between the transmitter 21 and the receiver 22 and the difference of frequency generated from the Doppler frequency. Further, two types of PN code are transmitted in the order in accordance with the M sequence code, so that even if the order can not all be detected, the start timing of the data (that is, the boundary of the data) can be specified.

With the above construction, the first and second PN codes S20, S21 are transmitted with the predetermined pattern at a transmission side, the first and second PN codes S20, S21 are detected at a reception side, and the order is detected, so that the synchronization of PN code can be surely detected even if the carrier-to-noise ratio C/N is low, and the boundary of data can be detected.

(1-2) Examples of Transformation (1-2-1) First Example of Transformation

Figure 9:
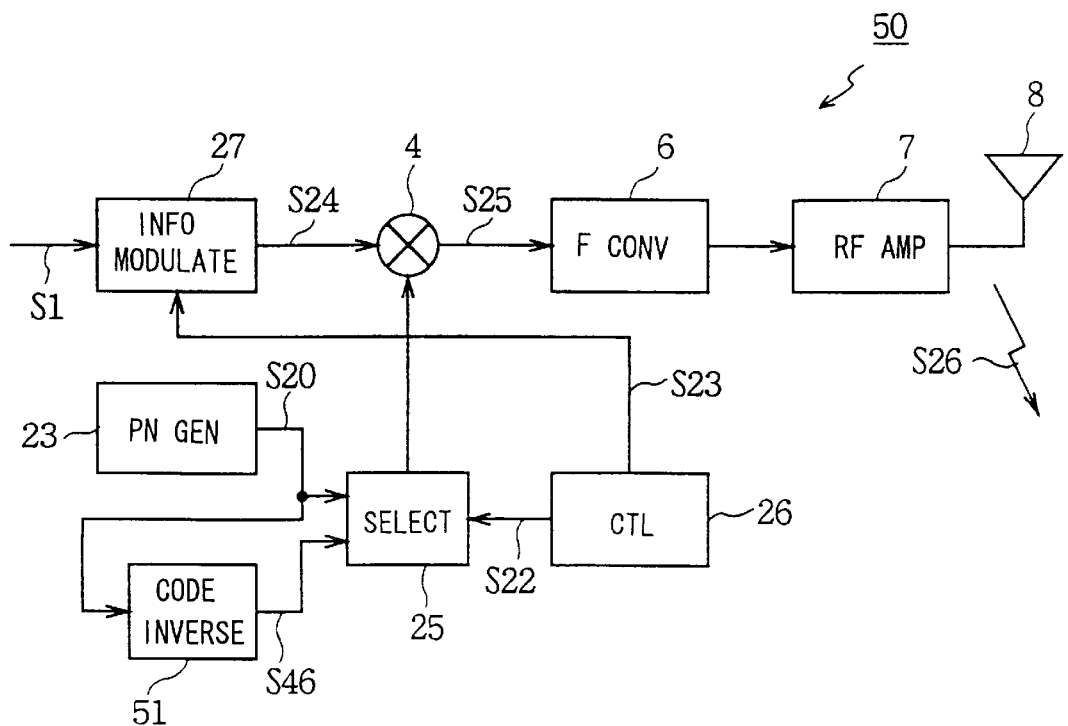
FIG. 9 is a block diagram showing the construction of a transmitter in the case where the two PN codes are generated by using a code inverting unit.

The first embodiment discussed above has dealt with the case where two PN generators 23, 24 are provided to generate two different PN codes (that is, the first and second PN codes S20, S21). However, this invention is not only limited to this, but as shown in FIG. 9 in which the portions corresponding to those of FIG. 3 are designated with the same symbols, two PN codes can be generated by using a code inversion unit 51. In this case, the first PN code S20 is generated by the PN generator 23, and the code of first PN code S20 is inverted by the code inversion unit 51 to produce the second PN code S46. Thereby, the PN generator can be eliminated to simplify the construction significantly.

In addition, in this case, the inversion or non-inversion of the first PN code is detected at a reception side, and it can be decided based on the detected result which portion of the initial synchronizing signal is being received.

(1-2-2) Second Example of Transformation

Further, the first embodiment discussed above has dealt with the case where the M sequence code of degree three is used when the first and second PN codes S20, S21 are transmitted. However, this invention is not only limited to this, but another degree can be used as the M sequence code. The degree of the M sequence code may be set to the proper value depending on the specification of a communication system, and it is not limited especially in this invention.

(1-2-3) Third Example of Transformation

Further, the first embodiment discussed above has dealt with the case where the first PN code S20 is selected when the code value of the M sequence code is "0", and the second PN code S21 is selected when the code value is "1". However, this invention is not only limited to this, but the second PN code S21 can be selected when the code value is "0", and the first PN code S20 can be selected when the code value is "1".

(1-2-4) Fourth Example of Transformation

Further, the first embodiment described above has dealt with the case where the M sequence code is used when the first and second codes S20, S21 are transmitted. However, this invention is not only limited to this, but the code that "0" is added and inserted to the M sequence code can be used. The code that "0" is added and inserted to the M sequence code, as shown in FIG. 10, can be easily obtained by outputting the enable signal E from the timing control circuit 40 to control the respective registers 42A to 42C of the M sequence code generator 41.

Concretely, as shown in FIG. 11, after the output of the M sequence code generator 41 becomes "0" twice continuously, the enable signal E is made its level to "L", and made the respective registers 42A to 42C to a disable condition. Therefore, the state of respective registers 42A to 42C become as shown in FIG. 12, and the code that "0" is inserted one more following to the twice continuous "0", that is, the code having one period of "1, 0, 1, 1, 1, 0, 0, 0" is produced.

Thus obtained code that "0" is added and inserted to the M sequence code has the period longer than the M sequence code for one. Therefore, if the first and second PN codes S20, S21 are selected by using such code to be transmitted, the number of times of PN code transmission can be increased, and the detection accuracy of PN code can be improved.

In addition, the case where the respective registers 42A to 42C are made to the disable condition after twice continuous "0" have been explained. However, actually the respective registers 42A to 42C can be made to the disable condition once before and after or during the portion of twice continuous "0". Similarly, if "0" is added and inserted to the M sequence code of degree N, respective registers can be made to the disable condition once before and after or during the portion where "0" continues (N−1) times.

Further, in the case where the code that "0" is added and inserted to the M sequence code is used to transmit the first and second PN codes S20, S21, if the degree of M sequence code is N, the PN code can be transmitted ($2^N+N-1$) times at its maximum. In this case, since the continuous PN codes to the number of N does not have the same order in the number of time of transmission, if the continuous PN codes to the number of N can be detected similar to the first embodiment described above, the start timing of the data can be specified at a reception side and the initialization timing of PN code for inverse-spreading can be specified.

Further, in the case where the code that "0" is added and inserted to the M sequence code is used to transmit the first and second PN codes S20, S21, it is necessary to change the number of detector of the timing detecting part 30 (symbols 47A to 47G in the figure) shown in FIG. 8. For example, in the case where the code that "0" is added and inserted to the M sequence code of degree three is used, it is necessary to provide eight detectors of the timing detecting part 30, and in the case where the code that "0" is added and inserted to the M sequence code of degree N, it is necessary to provide detectors to the number of $2^N$ of the timing detecting part 30.

(1-2-5) Fifth Example of Transformation

Further, the first embodiment described above has dealt with the case where only the detected result of PN code for continuous three times is used to specify the start timing of the data and the initialization timing of PN code. However, this invention is not limited to this, but the detected result of PN code for continuous four times can be used.

Figure 13:
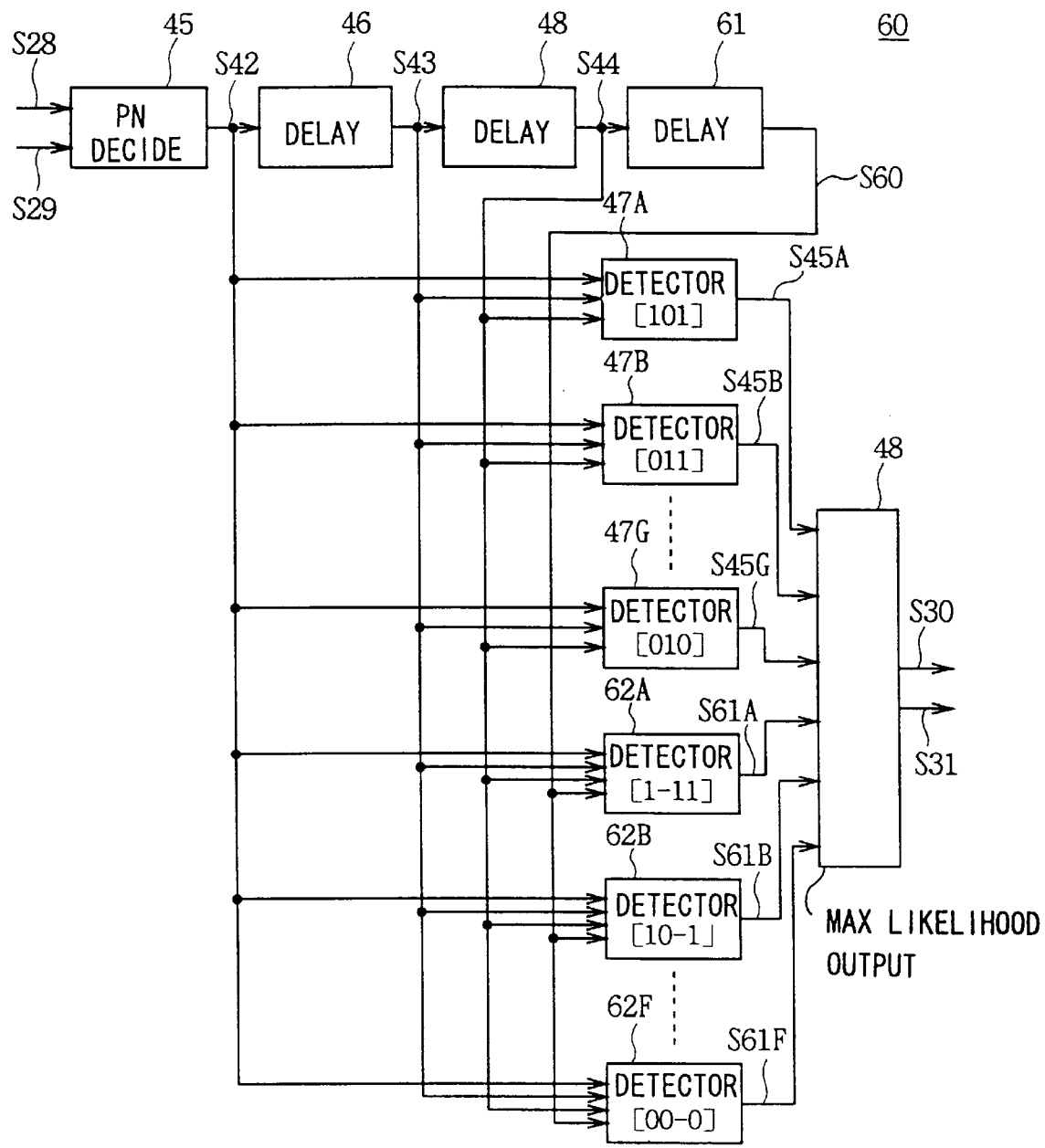
FIG. 13 is a block diagram showing the construction of the timing detecting part in the case of using the detected results for continuous four times.

In this case, the timing detecting part 60 will be explained with reference to FIG. 13. As shown in FIG. 13 in which the portions corresponding to those of FIG. 8 are designated with the same symbols, in the timing detecting part 60, three delay circuits 46, 48, and 61 are provided so that the detected signal S42 output from the PN deciding unit 45 is delayed for one period, two periods, and three periods.

The detectors 47A to 47G decide which portion of the initial synchronizing signal shown in FIG. 4 has been detected by using the detected result of the PN code for continuous three times (that is, detected signals S42, S43, and S44) similar to the first embodiment.

On the contrary, the detectors 62A to 62F decide which portion of the initial synchronizing signal shown in FIG. 4 has been detected by using the three coincidence in the detected result of PN code for continuous four times (S42, S43, S44, and S60).

For example, the detector 62A detects the first, third, and fourth coincidence in the first to fourth patterns of the initial synchronizing signal shown in FIG. 4. More specifically, the detector 62A detects the detected result of continuous four times: the first is the second PN code; the second is whichever; the third is the second PN code; and the fourth is the second PN code. Then, if such order is detected, the detector 62A outputs the detected signal S61A to the maximum likelihood output circuit 48. Thereafter, the detectors 62B to 62F also detects the three coincidence in the detected result of PN codes for continuous four times, and if it is detected, outputs the detected result S61B to S61F to the maximum likelihood output circuit 48.

In connection, in the detectors 47A to 47G and 62A to 62F in the figure, "0" indicates the detection of first PN code, "1" indicates the detection of second PN code, and "−" indicates whichever it can be.

The maximum likelihood output circuit 48 specifies the most reliable initial timing of PN code and the data start timing based on the inputted detected signal S45A to S45G and S61A to S61F, and produces the initializing signal S30 and the demodulating start timing signal S31 to output it.

In this way, by detecting not only the detected result of PN codes for continuous three times, but also using three coincidence in the detected result of PN codes for continuous four times, the number of times of detection increases and the detection accuracy can be improved. At the same time, the timing can be specified more accurately.

In connection, in the case where three detected results in the detected result of PN code for continuous four times are used to detect, because a plurality of same codes exist in the M sequence codes in some patterns, it may be not used. Therefore, in this case, it is necessary to exclude these patterns from the detection pattern.

Further, since the M sequence code of degree three is used here, three detected results are used from the detected result of PN codes for continuous four times. However, in the case where the M sequence code of degree N is used, the detected result for N times can be used from the detected result of PN code for continuous (N+1) times.

(2) Spread Spectrum Communication System performing Information Modulation after Spreading The spread spectrum communication system performing first the spread spectrum on the data to be transmitted and thereafter performing the information modulation will be explained in this paragraph.

(2-1) Second Embodiment

(2-1-1) Whole Construction

Figure 14A:
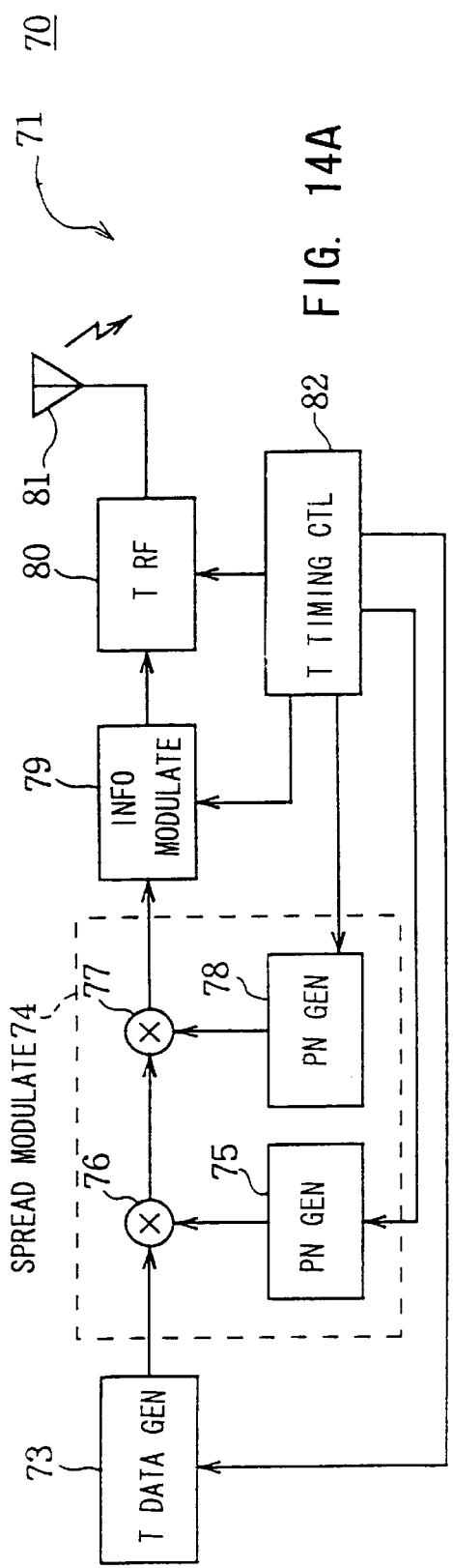
FIG. 14 is a block diagram showing the construction of the spread spectrum communication system of the second embodiment.
Figure 14B:
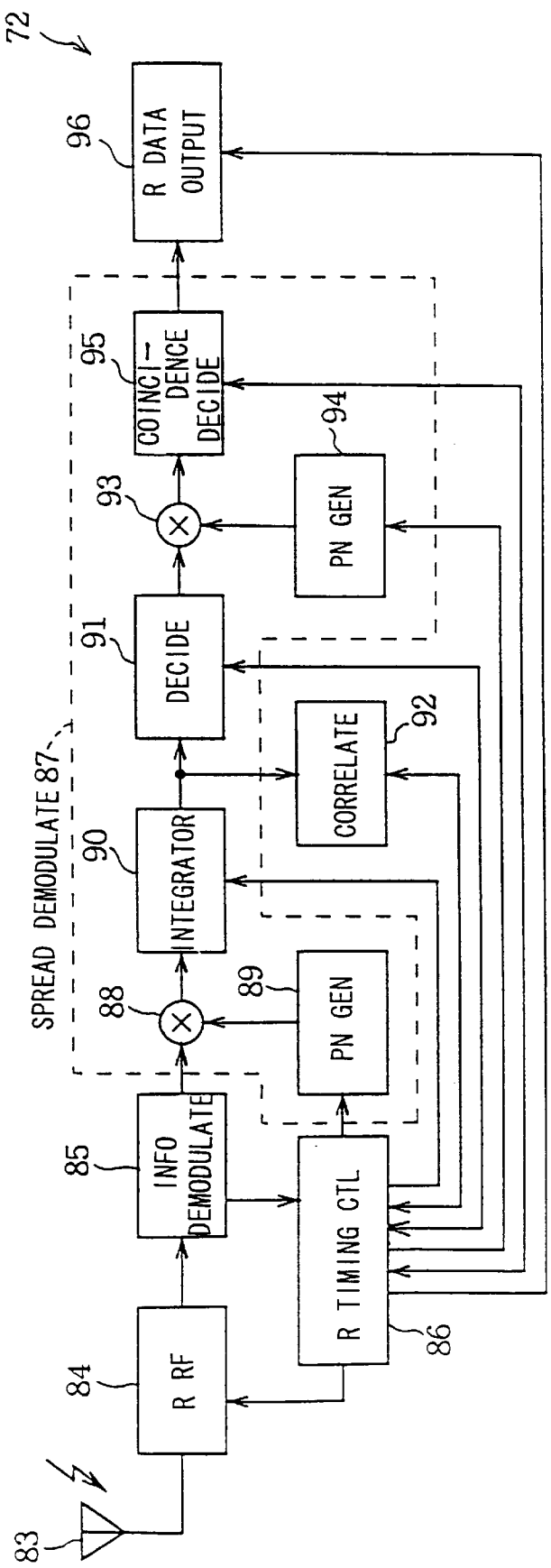

In FIG. 14, 70 generally shows the spread spectrum communication system which is constituted of a transmitter 71 and a receiver 72.

First, in the transmitter 71, digital transmission data to be transmitted such as audio data or control information is generated by a transmission data generating part 73. When the initial synchronizing signal is transmitted, the transmission data generating part 73 outputs the transmission data of bit "0" constantly to facilitate the initial synchronization detection.

The transmission data generated by the transmission data generating part 73 is inputted to a spread modulating part 74. In the spread modulating part 74, a first PN code is generated as a spread code by a PN generator 75. A multiplier 76 multiplies (that is, exclusive OR operation) the inputted transmission data and the first PN code to spread the transmission data, and outputs the obtained first spreading data to a multiplier 77. The multiplier 77 multiplies (that is, exclusive OR operation) the inputted first spreading data and the second PN code generated by a PN generator 78, and outputs the obtained second spreading data to an information modulating part 79.

The information modulating part 79 performs a modulation such as the phase modulation on a predetermined carrier wave by using the second spreading data, and outputs the obtained transmitting signal to a transmission RF (Radio Frequency) part 80. The transmission RF part 80 amplifies the transmitting signal in the predetermined frequency band. An antenna 81 radiates the transmitting signal output from the RF amplifying part 80 into a space.

In this way, the transmitter 71 performs a primary modulation by the spread spectrum at the spread modulating part 74 on the transmission data generated at the transmission data generating part 73, thereafter performing a secondary modulation at the information modulating part 79.

Here, a transmission timing controlling part 82 instructs, in the output timing of each data, the transmission data generating part 73, the PN generators 75, 78, the information modulating part 79, and the transmission RF part 80. The transmission timing controlling part 82 instructs the transmission data generating part 73 to start to output the transmission data, and instructs the PN generator 75 to output the first PN code for "n" period ("n" is an integer, e.g., "4") with respect to one bit of transmission data output from the transmission data generating part 73. Further, the transmission timing controlling part 82 instructs the PN generator 78 to output one chip of second PN code for each one period of first PN code (that is, instructs it to output "n" chips of second PN code with respect to one bit of transmission data).

On the other hand, the transmission timing controlling part 82 instructs the information modulating part 79 to perform the modulation such as a phase modulation on the second spreading data for each chip output from the multiplier 77. Further, it instructs the transmission RF part 80 to perform the processing only when the transmitting signal is output from the information modulating part 79.

Thus, in the transmitter 71, the timing in each part is controlled by the transmission timing controlling part 82, so that the transmission data generated by the transmission data generating part 73 is spread using the first and second PN codes.

In connection, the exclusive OR operation of the multiplier 77 as described above allows the second spreading data to be equal to the first spreading data if the second PN code is "0", and therefore the transmission data is spread by the first PN code. Further, the second spreading data is equal to the data that the first spreading data is inverted if the second PN code is "1", and therefore the transmission data is spread by the inverse code of first PN code.

Here, there will be considered the case of generating the second PN code, by the PN generator 78, which constitutes one period with sixteen chips of the code that "0" is added and inserted into the M sequence code of degree four, for example, "1, 1, 0, 1, 0, 1, 1, 0, 0, 1, 0, 0, 0, 0, 1, 1". More specifically, as the second PN code, "1→1→0→1→0→1→1→0→0→1→0→0→0→0→1→1→ . . ." is successively repeated.

In this second PN code, there is the characteristics that the values of arbitrary continuous four chips differ from one another. In other words, when arbitrary continuous four chips are taken out, the same value does not exist in one period. Therefore, in the case of a transmission using the second PN code, if the second PN code can be received for four chips continuously at a reception side, it can be judged based on the four chips which data of second PN code has been received. Although the case of M sequence code of degree four has been explained above, the position can be judged on the basis of the continuous N chips (or more) in the case of M sequence code of degree N.

Hence, in the transmitter 71, based on this way of thinking, the signal for one period of second PN code is transmitted as the initial synchronizing signal, and the data is transmitted immediately after the initial synchronizing signal. Therefore, if the receiver 72 receives the second PN code for the predetermined chips continuously, the position of the received second PN code is judged to decide when does the data begin.

Next, the receiver 72 will be explained. The receiver 72 receives first the transmitting signal transmitted from the transmitter 71 at an antenna 83, and inputs it as a receiving signal to a reception RF part 84. The reception RF part 84 selects the signal of a desired frequency band from the receiving signal to amplify it, and outputs the obtained signal to an information demodulating part 85. In this case, the reception RF part 84 starts the receiving operation based on the timing signal from the reception timing controlling part 86.

The information demodulating part 85 performs the opposite processing to the processing performed at the information modulating part 79 at a transmission side, and outputs the obtained information demodulating data to a spread demodulating part 87. Further, the information demodulating part 85 outputs operation signal signifying the start of demodulation to the reception timing controlling part 86.

Here, the spread demodulating part 87 inputs the information demodulating data outputted from the information demodulating part 85 to a multiplier 88. The multiplier 88 multiplies (that is, exclusive OR calculation) the first PN code generated at a PN generator 89 same as that of a transmission side and the inputted information demodulating data, to perform the inverse-spreading on the information demodulating data. Then, the obtained inverse-spreading data is outputted to an integrator 90.

In connection, the PN generator 89 operates based on the instruction from the reception timing controlling part 86, and outputs the first PN code for one chip with respect to one chip of the information demodulating data output from the information demodulating part 85.

The integrator 90 operates based on the instruction of the reception timing controlling part 86, and integrates the inverse-spreading data of a fixed period to output the integrated result to a deciding part 91 and a correlation unit 92.

In this case, the integrator 90 first makes the total result to be a clear condition "0", and sums up the inverse-spreading data for one period of first PN code from that state to output them as the integrated result. Then, the integrator 90 repeats the operation for each one period of the first PN code sequentially.

The correlation unit 92 operates based on the instruction from the reception timing controlling part 86 when the integration period in the integrator 90 terminates, to obtain the correlation between the receiving signal and the first PN code. Concretely, the correlation unit 92 obtains the correlation between the first PN code generated at the PN generator 75 contained in the receiving signal, or its inverse code, and the first PN code generated at the PN generator 89. At this time, the correlation unit 92 squares the integrated result output from the integrator 90 to calculate the reception energy and obtains the correlation. Then, if the obtained correlation exceeds the predetermined threshold value, the correlation unit 92 decides that the first PN code contained in the receiving signal is synchronized with the first PN code generated at the PN generator 89, and outputs the decided result to the reception timing controlling part 86.

In connection, in the correlation unit 92, the high correlation value can be obtained in the case where the first PN code generated at the PN generator 89 is synchronized with the first PN code contained in the receiving signal, regardless of the inversion and the non-inversion of the first PN code contained in the receiving signal.

Meanwhile, the deciding part 91 operates based on the instruction from the reception timing controlling part 86. The integrated result outputted from the integrator 90 is compared to the predetermined threshold value to decide that either of the first PN code generated at the PN generator 75 at a transmission side or its inverse code is included in the receiving signal. More specifically, the deciding part 91 decides "0" or "1" of the second PN code generated at the PN generator 78 of a transmission side, and outputs the decided result to a multiplier 93. In this case, the decided result outputted from the deciding part 91 is equal to the second PN code of the PN generator 78 if the communication error does not occur. However, if the communication error occurs, the decided result may differ from the second PN code. Thereby, hereinafter, the decided result outputted from the deciding part 91 is referred to as a third PN code.

Also, when outputting the decided result to the multiplier 93, the deciding part 91 outputs the output timing to the reception timing controlling part 86.

The multiplier 93 multiplies (that is, the exclusive OR calculation) the second PN code generated at a PN generator 94 and the third PN code inputted, and outputs the calculated result to a coincidence deciding part 95. In this case, the PN generator 94 operates with the same timing as the deciding part 91 based on the instruction from the reception timing controlling part 86 to generate the same second PN code as the code generated at the PN generator 78 at a transmission side.

The coincidence deciding part 95 operates based on the instruction from the reception timing controlling part 86, to decide the synchronization between the PN generator 78 at a transmission side and the PN generator 94 at a reception side based on the calculated result for "n" chips of the third PN code. In this case, the coincidence deciding part 95 decides, if the third PN code and the second PN code generated at the PN generator 94 completely coincide with each other or are perfectly inversive through "n" chips, that the PN generator 78 and the PN generator 94 are synchronized with each other. Further, the coincidence deciding part 95 decides, if the third PN code and the second PN code coincide partly or are partly inversive in "n" chips, that the PN generator 78 and the PN generator 94 are not synchronized with each other. Then, the decided result of the coincidence deciding part 95 is outputted to the reception timing controlling part 86.

When the determination of data following the initial synchronizing signal starts, the coincidence deciding part 95 outputs "0" if the third PN code coincides with the second PN code perfectly through "n" chips, and outputs "1" if they are perfectly inversive, as a reception data to a reception data outputting part 96. Because if the transmission data is spread and transmitted by using the first and second PN codes, the third PN code is equal to the second PN code when the transmission data is "0", and the third PN code is inversive to the second PN code when the transmission data is "1".

The reception data outputting part 96 operates in accordance with the instruction from the reception timing controlling part 86, and uses the inputted reception data as a data such as the audio data or control information.

As described above, the reception timing controlling part 86 controls the timing of the operation of the reception RF part 84, the PN generators 89, 94, the integrator 90, the correlation unit 92, the deciding part 91, the coincidence deciding part 95, and the reception data outputting part 96, based on the operation signal outputted from the information demodulating part 85, the decided result outputted from the correlation unit 92, the output timing outputted from the deciding part 91, and the decided result output from the coincidence deciding part 95.

Figure 15:
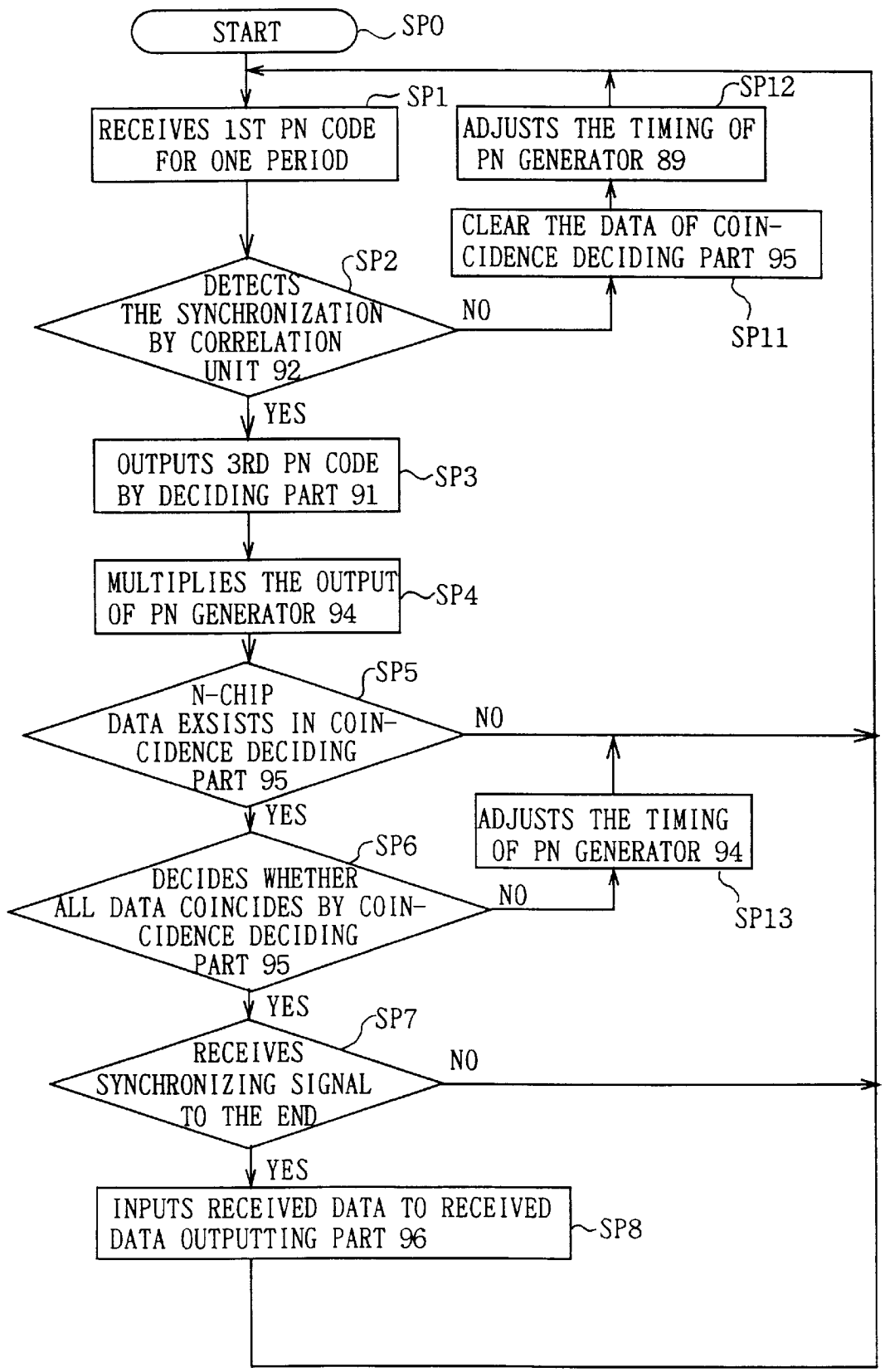
FIG. 15 is a flow chart showing the operation procedure of the receiver of the second embodiment.

Thus, the reception timing controlling part 86 controls the timing of the operation of each part in the above way, so that the receiver 72 executes the procedure shown in FIG. 15 to receive the transmitting signal outputted from the transmitter 71.

More specifically, in the receiver 72, the processing enters from step SP0 where the reception timing controlling part 86 instructs the reception RF part 84 to start the reception. Then, at step SP1, the reception timing controlling part 86 instructs about the operation timing of the PN generator 89 and the integrator 90 in accordance with the operation signal from the information demodulating part 85, so as to receive the first PN code for one period. In this case, the reception timing controlling part 86 instructs the PN generator 89 to output the first PN code for one chip with respect to the information decoding data for one chip decoded by the information decoding part 85, and instructs the integrator 90 about the timing to start integration.

Next, at step SP2, when the integration period at the integrator 90 terminates, the reception timing controlling part 86 instructs the correlation unit 92 to calculate the correlation between the receiving signal and the first PN code generated at the PN generator 89. Thereby, the correlation unit 92 calculates the correlation between the first PN code generated at the PN generator 75 which is contained in the receiving signal, or its inverse code, and the first PN code generated at the PN generator 89 to detect the synchronization of the first PN code. As a result, in the reception timing controlling part 86, the processing proceeds to step SP3 if the synchronization of the first PN code is detected by the correlation unit 92, and proceeds to step SP11 if it is not detected.

In the case where the synchronization is not detected and the processing proceeds to step SP11, the reception timing controlling part 86 instructs the coincidence deciding part 95 to clear the past data maintained in the coincidence deciding part 95. Then, at step SP12, the reception timing controlling part 86 controls the timing of the generation of the first PN code at the PN generator 89 (concretely, the first PN code is moved forward or delayed to the information demodulation data outputted from the information demodulating part 85) to adjust so that the synchronization of the first PN code can be obtained, and the processing returns to step SP1 to repeat the operation.

Meanwhile, in the case where the synchronization is detected and the processing proceeds to step SP3, the reception timing controlling part 86 instructs the deciding part 91 to decide a data. The deciding part 91 compares the integrated result with the predetermined threshold value to decide whether either of the first PN code or its inverse code is contained in the receiving signal (that is, decide "0" or "1" of the second PN code generated at the PN generator 78). The decided result is outputted as the third PN code.

Then, at step SP4, the reception timing controlling part 86 instructs the PN generator 94 to output the second PN code at the same timing as the deciding part 91. Therefore, the PN generator 94 generates the second PN code to output it to the multiplier 93. The multiplier 93 multiplies the second PN code and the third PN code outputted from the deciding part 91, and outputs the calculated result to the coincidence deciding part 95.

Next, at step SP5, the reception timing controlling part 86 determines whether or not the calculated result is stored for "n" chips in the coincidence deciding part 95. If it is stored for "n" chips, the processing proceeds to step SP6. If it is not stored, the processing returns to step SP1 to repeat the operation. That is, only if the synchronization is successively obtained "n" times at the correlation unit 92, the processing proceeds to step SP6.

At step SP6, the reception timing controlling part 86 instructs the coincidence deciding part 95 to decide the coincidence of the third PN code and the second PN code. In this case, the coincidence deciding part 95 decides, if the third PN code and the second PN code completely coincide with each other or are perfectly inversive through "n" chips, that the PN generator 78 is synchronized with the PN generator 94. If the third PN code and the second PN code partly coincide with each other or are partly inversive through "n" chips, the coincidence deciding part 95 decides that the PN generator 78 is not synchronized with the PN generator 94. As a result, if it is decided that the PN generator 78 is synchronized with the PN generator 94, the reception timing controlling part 86 proceeds to step SP7, and if it is decided that the PN generator 78 is not synchronized with the PN generator 94, the reception timing controlling part 86 proceeds to step SP13.

If the synchronization is not detected and the processing proceeds to step SP13, the reception timing controlling part 86 controls the generating of the timing of the second PN code in the PN generator 94 (concretely, the second PN code is advanced or delayed from the third PN code outputted from the deciding part 91), so as to obtain the synchronization of the second PN code, and returns to step SP1 to repeat the operation.

Meanwhile, if the synchronization is detected and the processing proceeds to step SP7, the reception timing controlling part 86 decides which part of the initial synchronizing signal is being received, and receives the initial synchronizing signal to the end of it in accordance with the decided result. The reception timing controlling part 86 receives to the end of the initial synchronizing signal, then proceeds to step SP8. In connection, at step SP7, the reception timing controlling part 86 returns to step SP1 to repeat the reception of the initial synchronizing signal if the reception of the initial synchronizing signal does not complete to the end.

At step SP8, the reception timing controlling part 86 informs that the reception of the initial synchronizing signal has been terminated to the coincidence deciding part 95. The coincidence deciding part 86 demodulates the reception data to output to the reception data output part 96.

Further, the reception timing controlling part 86 instructs the reception data outputting part 96 to use the reception data outputted from the coincidence deciding part 95 as a data such as audio data or control information. Thereafter, the reception timing controlling part 86 returns to step SP1 to continue the data reception.

Thus, in the receiver 72, the procedure described above is performed to receive the transmitted signal transmitted from the transmitter 71.

(2-1-2) Operation and Effects of the Embodiment

In the above construction, in the case of communicating between the transmitter 71 and the receiver 72, the transmitter 71 transmits first the initial synchronizing signal regarding the transmission data as "0", then transmits the transmission data practically. At this time, the transmitter 71 spreads firstly the transmission data by using the first PN code to obtain the first spreading data. Next, the transmitter 71 inverts or non-inverts the first spreading data for each one period of the first PN code by using the second PN code in which one chip is outputted for each one period of the first PN code, to obtain the second spreading data. The transmitter 71 performs a modulation such as the phase modulation on the predetermined carrier wave based on the second spreading data obtained in the above way. The obtained transmitting signal is transmitted with the predetermined frequency through the transmission RF part 80 and the antenna 81 successively.

Meanwhile, in the receiver 72, the operation timing of each part is controlled by the reception timing controlling part 86, so as to receive the transmitting signal transmitted from the receiver 71. In this case, the receiver 72 firstly obtains the receiving signal through the antenna 83 and the reception RF part 84 successively. Next, the receiver 72 demodulates the receiving signal on which the modulation such as the phase modulation is performed at the information demodulating part 85 to obtain the information demodulation data. The information demodulation data is demodulated at the spread demodulating part 87 to obtain the reception data.

Here, in the receiver 72, the first PN code generated at the PN generator 89 is multiplied with the information demodulation data so as to perform the inverse-spreading on the information demodulation data to obtain the inverse-spreading data. Then, in the receiver 72, the inverse-spreading data is integrated for each one period of the first PN code, and the correlation between the first PN code in the receiving signal and the first PN code generated at the PN generator 89 is decided by the correlation unit 92 in accordance with the integrated result. Based on the decided result, the timing of generating PN code of the PN generator 89 is controlled to synchronize the first PN code in the receiver 72.

Further, in the receiver 72, "0" or "1" of the second PN code contained in the receiving signal is decided in accordance with the integrated result of the integrator 90 to obtain the third PN code. In this case, the deciding part 91 detects the inversion or non-inversion of the first PN code in the receiving signal from the integrated result so as to decide "0" or "1" of the second PN code.

Then, in the receiver 72, the third PN code is multiplied by the second PN code generated at the PN generator 94.

The coincidence deciding part 95 decides the synchronization of the third PN code and the second PN code generated at the PN generator 94 in accordance with the calculated result. In this case, the coincidence deciding part 95 detects the coincidence between the third PN code and the second PN code. As a result, if the third PN code perfectly coincides with the second PN code, it is decided that they are synchronized with each other.

As a result of such decision, if it is decided that they are not synchronized with each other, the timing of generating PN code of the PN generator 94 is controlled to synchronize the second PN code. If it is decided that they are synchronized with each other, after the initial synchronization signal has been completed, the reception data is demodulated in accordance with the calculated result output from the multiplier 93 at the coincidence deciding part 95.

Thus, in the spread spectrum communication system 70, the first PN code is inverted or non-inverted in accordance with the second PN code to transmit, and the synchronization of the first PN code is detected at a reception side. Simultaneously, the inversion or non-inversion of the first PN code is detected to generate the third PN code and that of the second PN code is estimated. Then, the coincidence, having a predetermined length, of the second PN code generated at a reception side and the third PN code allows the detection of the synchronization of the second PN code. Therefore, the synchronization for several periods of the first PN code can be confirmed, so as to improve the accuracy of detection of synchronization comparing to the case where the synchronization is detected only by one PN code, and so as to surely detect the synchronization of the PN code even when the carrier-to-noise ratio C/N is low. Moreover, the boundary between the initial synchronizing signal and data, or the boundary between the data for each bit can be decided by the second PN code. Furthermore, the detection described above makes it unnecessary to add the redundant code which is the start code at the head of the data as a conventional technique.

According to the above construction, the first PN code is inverted or non-inverted in accordance with the second PN code at a transmission side, and the synchronization of the first PN code is detected at a reception side. Simultaneously, the third PN code upon which the second PN code is estimated is generated in accordance with the inversion or non-inversion of the first PN code, and the synchronization of the second PN code is detected by the coincidence, having a predetermined length, of the third PN code and the second PN code generated at a reception side. Therefore, the synchronization of the PN code can be detected and the boundary of the data can be detected, even if the carrier-to-noise ratio C/N is low.

(2-2) Third Embodiment (2-2-1) Whole Construction

Figure 16A:
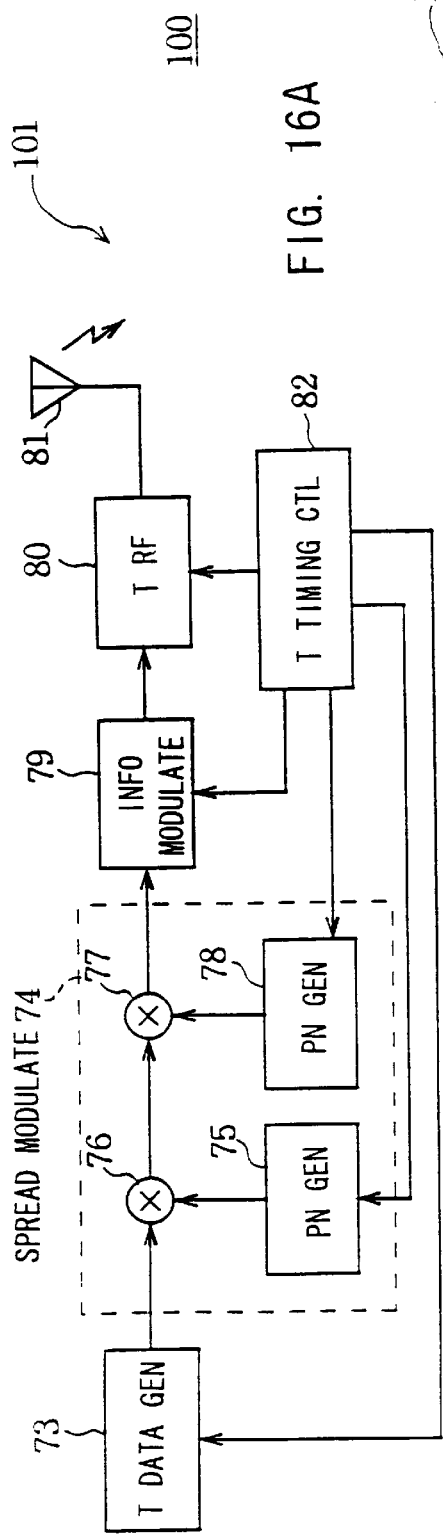
FIG. 16 is a block diagram showing the construction of the spread spectrum communication system of the third embodiment.
Figure 16B:
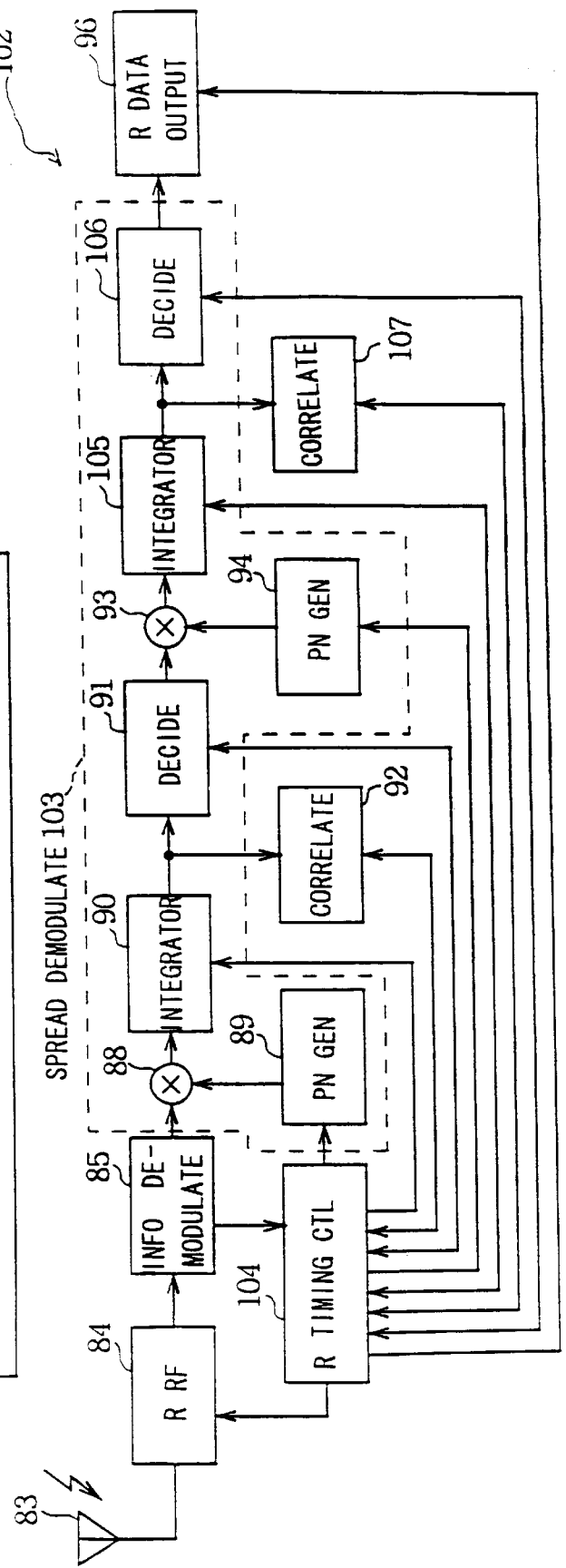

Referring to FIG. 16 in which the portions corresponding to those of FIG. 14 are designated with the same symbols, 100 shows a spread spectrum communication system which is entirely composed of a transmitter 101 and a receiver 102.

Firstly, the transmitter 101 will be explained. In this embodiment, although the transmitter 101 is constructed mostly similar to the transmitter 71 in the second embodiment, the operation of the spread modulating part 74 differs from the second embodiment. More specifically, in the transmitter 101, the second PN code, having a comparatively short period, is generated for "n" chips (here, "n" is an integer more than the degree of the second PN code) at the PN generator 78 with regard to one bit data generated by the transmission data generating part 73, and the first PN code, having a comparatively short period, is generated for "k" chips (here, "k" is an integer more than the degree of the first PN code) with regard to one bit of the second PN code. In other words, one chip of the second PN code is generated for each "k" chips of the first PN code. Therefore, in the transmitter 101, one bit of the transmission data is spread to (k×n) chips by using the first and second PN codes.

Similar to the second embodiment, it will be considered, for example, that the PN generator 78 generates the second PN code constituting one period with sixteen chips, "1, 1, 0, 1, 0, 1, 1, 0, 0, 1, 0, 0, 0, 0, 1, 1" in which "0" is added and inserted to the M sequence code of degree four. That is, the second PN code sequentially repeats, "1→1→0→1→0→1→1→0→0→1→0→0→0→0→1→1→ . . . ".

In such second PN code, there is a characteristic that the values of continuous arbitrary four chips respectively differ from one another. In other words, when the continuous arbitrary four chips are taken out, the same values do not exist in the one period. Thereby, in the case of transmitting by using the second PN code with the procedure described above, if the second PN code can be received for continuous four chips, it can be decided, based on the four chips, which position of the data of the second PN code has been received.

On the basis of this way of thinking, the chip number "n" of the second PN code generated by the PN generator 78 needs a number more than the degree of the second PN code. In the second embodiment, the number of chips "n" is usually equal to the degree of the second PN code. However, this embodiment has the effect especially in the case where the number of chips "n" is increased more than the degree of the second PN code.

When the PN code can not be synchronized, the correlation value of the auto-correlation characteristic is lowered, and not to misconceive the non-synchronizing state as the synchronizing state even if the noise exists much and becomes complicated, it is desirable that the number of chips "k" of the first PN code is the period length of the first PN code and the number of chips "n" of the second PN code is the period length of the second PN code. Hereinafter, in this embodiment there wall be explained with the second PN code being a code that "0" is added and inserted to the M sequence code of degree four described above, and with the number of chips "n" being the period length of the second PN code (that is, n=16).

Further, in this embodiment, the transmitter 101 outputs the transmission data of bit "0" from the transmission data generating part 73, and transmits the signal for one period of the second PN code as an initial synchronizing signal. Then, the actual data is transmitted immediately after the initial synchronizing signal. At this time, it is the same method as the second embodiment that, if the second PN code is "0", the transmission data is spread by the first PN code for "k" chips, and if the second PN code is "1", the transmission data is spread by the inverse code of the first PN code for "k" chips.

Next, the receiver 102 will be explained. In this embodiment, the information demodulation data obtained through the antenna 83, the reception RF part 84, and the information demodulating part 85 is inputted to a spread demodulating part 103 to be inverse-spread.

In connection, it is the same method that the operation signal signifying the start of a receiving operation by the reception RF part 84 based on the timing signal from a reception timing controlling part 104, and signifying the start of demodulation by the information demodulating part 85 is outputted to the reception timing controlling part 104.

In the spread demodulating part 103, the information demodulation data outputted from the information demodulating part 85 is inputted to the multiplier 88. The multiplier 88 multiplies the same first PN code generated at the PN generator 89 as that of a transmission side and the inputted information demodulation data (that is, exclusive OR calculation), so as to perform the inverse-spread on the information demodulation data, to output the obtained inverse-spreading data to the integrator 90. In this case, the PN generator 89 operates based on the instruction from the reception timing controlling part 104, and outputs one chip of the first PN code with respect to one chip of the information demodulation data outputted from the information demodulating part 85.

The integrator 90 operates on the basis of the instruction from the reception timing controlling part 104, and integrates the inverse-spreading data of a fixed period to output the integrated result to the deciding part 91 and the correlation unit 92. In this case, the integrator 90 clears the total result to "0" first, and sums up the inverse-spreading data for "k" chips of the first PN code from that state to output it as the integrated result. The integrator 90 repeats this for each "k" chips of the first PN code.

The correlation unit 92 operates based on the instructions of the reception timing controlling part 104 when the integrating period in the integrator 90 terminates, and obtains the correlation between the receiving signal and the first PN code, More specifically, the correlation unit 92 obtains the correlation between the first PN code or its inverse code, generated at the PN generator 75, which is contained in the receiving signal, and the first PN code generated at the generator 89. At this time, the correlation unit 92 calculates the reception energy by squaring the integrated result outputted from the integrator 90 to obtain the correlation. Then, the correlation unit 92 decides, if the obtained correlation is over the predetermined threshold value, that the first PN code contained in the receiving signal is synchronized with the first PN code generated at the PN generator 89, to output the decided result to the reception timing controlling part 104.

In that connection, in the correlation unit 92, regardless of the inversion or non-inversion of the first PN code contained in the receiving signal, if it is synchronized with the first PN code generated at the PN generator 89, the high correlation value can be obtained.

Meanwhile, the deciding part 91 operates based on the instruction from the reception timing controlling part 104. By comparing the integrated result outputted from the integrator 90 to the predetermined threshold value, the deciding part 91 decides that either of the first PN code generated at the PN generator 75 at a transmission side or its inverse code is included in the receiving signal. That is, the deciding part 91 decides "0" or "1" of the second PN code generated at the PN generator 78 at a transmission side, and outputs the decided result to the multiplier 93 as a third PN code similar to the second embodiment. Also, the deciding part 91 outputs the output timing to the reception timing controlling part 104, when the decided result is outputted to the multiplier 93.

The multiplier 93 multiplies (that is, exclusive OR calculation) the second PN code generated at the PN generator 94 and the inputted third PN code, and outputs the calculated result to the integrator 105. More specifically, the multiplier 93 performs the inverse-spreading by the second PN code on the third PN code. In this case, the PN generator 94 operates with the same timing as the deciding part 91 based on the instruction from the reception timing controlling part 104, and generates the same second PN code as a code generated at the PN generator 78 at a transmission side.

The integrator 105 integrates the calculated result outputted from the multiplier 93, and outputs the integrated result to a deciding part 106 and a correlation unit 107. In this case, the integrator 105 adds the calculated result outputted from the multiplier 93 to the past integrated value, so that the third PN code for "n" chips is integrated. Also, the integrator 105 outputs the timing signal to inform the termination of integration to the reception timing controlling part 104 when the third PN code for "n" chips terminates.

The correlation unit 107 operates based on the instruction of the reception timing controlling part 104. The correlation between the third PN code (that is, the second PN code generated at the PN generator 78 which is contained in the receiving signal) and the second PN code generated at the PN generator 94. In this case, the correlation unit 107 squares the integrated result outputted from the integrator 105 and calculates the reception energy to obtain the correlation. Then, the correlation unit 107, if the obtained correlation is over the predetermined threshold value, decides that the second PN code contained in the receiving signal is synchronized with the second PN code generated at the PN generator 94, and outputs the decided result to the reception timing controlling part 104.

In that connection, even in the correlation unit 107, regardless of the inversion or non-inversion of the second PN code contained in the receiving signal, if it is synchronized with the second PN code generated at the PN generator 94, the high correlation value can be obtained.

Meanwhile, the deciding part 106 operates based on the instruction from the reception timing controlling part 104. After the termination of the initial synchronizing signal, the integrated result outputted from the integrator 105 is compared with the predetermined threshold value, to decide "0" or "1" of the transmission data generated by the transmission data generating part 73. Then, the decided result is outputted to the reception data outputting part 96 as a reception data. Further, the deciding part 106 outputs the output timing to the reception timing controlling part 104 when the decided result is outputted.

The reception data output part 96 operates based on the instruction from the reception timing controlling part 104, and uses the inputted reception data as a data such as the audio data and the control information.

Here, as described above, the reception timing controlling part 104 controls the operation timing of the reception RF part 84, the PN generators 89, 94, the integrators 90, 105, the correlation units 92, 107, the deciding parts 91, 106, and the reception data outputting part 96, based on the operation signal outputted from the information demodulating part 85, the decided result outputted from the correlation units 92, 107, the output timing outputted from the deciding parts 91, 106 and timing signal outputted from the integrator 105.

Figure 17:
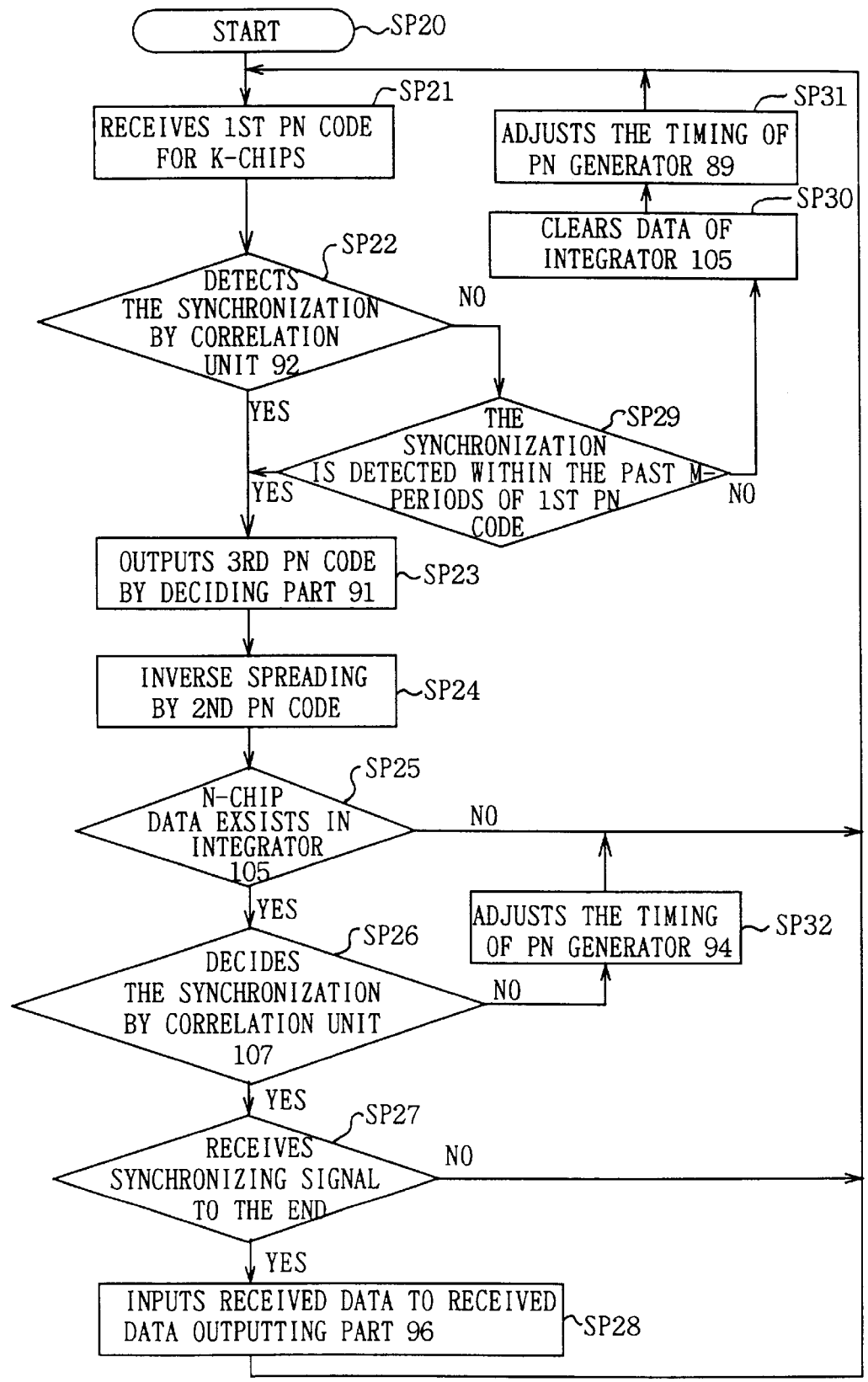
FIG. 17 is a flow chart showing the operation procedure of the receiver of the third embodiment.

In this way, the reception timing controlling part 104 controls the operation timing of each part, the receiver 102 receives the transmitting signal outputted from the transmitter 101, by performing the procedure showing FIG. 17.

More specifically, in the receiver 102 the processing enters from step SP20, and the reception timing controlling part 104 instructs the reception RF part 84 to start reception. Next, at step SP21, the reception timing controlling part 104 instructs the operation timing of the PN generator 89 and the integrator 90 based on the operation signal from the information demodulating part 85, so that the first PN code for "k" chips is received. In this case, the reception timing controlling part 104 instructs the PN generator 89 to generate the first PN code for "k" chips, and instructs the integrator 90 to integrate the inverse-spreading data of the first PN code for "k" chips.

Next, at step SP22, the reception timing controlling part 104 instructs the correlation unit 92 to calculate the correlation between the receiving signal and the first PN code generated at the PN generator 89. Therefore, the correlation unit 92 calculates the correlation between the first PN code generated at the PN generator 75 or its inverse code contained in the receiving signal and the first PN code generated at the PN generator 89, to detect the synchronization of the first PN code. As a result, the reception timing controlling part 104 proceeds to step SP23 if the synchronization of the first PN code is detected by the correlation unit 92, and proceeds to step SP29 if the synchronization is not detected.

When the synchronization is not detected and the processing proceeds to step SP29, the reception timing controlling part 104 decides whether or not the correlation unit 92 detects the synchronization of the first PN code within the past "m" period (here, "m" is a natural number, and is set to under the chip number "n" of the second PN code). The reception timing controlling part 104 proceeds to step SP23 if the synchronization is detected, and proceeds to step SP30 if the synchronization is not detected.

In connection, by deciding whether or not the synchronization has been detected in the past, the reception timing controlling part 104 can proceed to step SP23 even if the synchronization is not detected continuously "n" times at the correlation unit 92. Therefore, even if the synchronization is not detected due to the strong noise after the synchronization has been detected once, the processing can proceed to the detection of the synchronization of the second PN code.

When the processing proceeds to step SP30 in accordance with the decision at step SP29, the reception timing controlling part 104 instructs the integrator 105 to clear the integrated value of the past data maintained in the integrator 105. Then, at step SP31, the reception timing controlling part 104 controls the generating timing of the first PN code in the PN generator 89 (that is, the first PN code is advanced and delayed with regard to the information demodulating data outputted from the information demodulating part 85), so as to adjust to obtain the synchronization of the first PN code and return to step SP21 to repeat the operation.

Meanwhile, when the synchronization is detected and the processing proceeds to step SP23, the reception timing controlling part 104 instructs the deciding part 91 to decide the data. Thereby, the deciding part 91 compares the integrated result with the predetermined threshold value, so as to decide that either of the first PN code for one chip or its inverse code is contained in the receiving signal (that is, decide "0" or "1" of the second PN code generated at the PN generator 78), and the decided result is outputted as the third PN code.

Next, at step SP24, the reception timing controlling part 104 instructs the PN generator 94 to output the second PN code at the same timing as the deciding part 91. Thereby, the multiplier 93 multiplies the second PN code generated at the PN generator 94 and the third PN code outputted from the deciding part 91 to output the calculated result to the integrator 105. The integrator 105 adds the calculated result to the past integrating value to integrate them.

At step SP25, the reception timing controlling part 104 decides whether or not the data of the third PN code for "n" chips has been integrated at the integrator 105. Then, the reception timing controlling part 104 proceeds to step SP26 if the data for "n" chips has been integrated, and it returns to step SP21 to repeat the operation if the data for "n" chips is not integrated.

At step SP26, the reception timing controlling part 104 instructs the correlation unit 107 to calculate the correlation between the third PN code and the second PN code generated by the PN generator 94. Thereby, the correlation unit 107 calculates the correlation between the third PN code (that is, the second PN code generated at the PN generator 78 contained in the receiving signal) and the second PN code generated at the PN generator 94 to detect the synchronization of the second PN code. As a result, the reception timing controlling part 104 proceeds to step SP27 if the synchronization of the second PN code is detected by the correlation unit 107, and proceeds to step SP32 if the synchronization is not detected.

When the synchronization is not detected and the processing proceeds to step SP32, the reception timing controlling part 104 controls the generating of the timing of the second PN code in the PN generator 94 to adjust so that the synchronization of the second PN code can be obtained, and returns to step SP21 to repeat the operation.

Meanwhile, if the synchronization is detected and the processing proceeds to step SP27, the reception timing controlling part 104 decides that which part of the initial synchronizing signal is received based on the second PN code, and receives the initial synchronizing signal to the end in accordance with the decided result. When the reception timing controlling part 104 receives the initial synchronizing signal to the end, the processing proceeds to step SP28. At step SP27, if the reception timing controlling part 104 does not receive the initial synchronizing signal to the end, the processing returns to step SP21 to repeat the reception of the initial synchronizing signal.

At step SP28, the reception timing controlling part 104 instructs the deciding part 106 about the deciding timing of data. Thereby, the deciding part 106 compares the integrated result outputted from the integrator 105 with the predetermined threshold value, so as to decide "0" or "1" of the transmission data outputted from the transmission data generating part 73, and the decided result is outputted to the reception data outputting part 96 as a reception data.

Further, the reception timing controlling part 104 instructs the reception data outputting part 96 to use the reception data outputted from the deciding part 106 as a data such as the audio data or control information. Thereafter, the reception timing controlling part 104 returns to step SP21 to continue the data reception.

Thus, the receiver 102 receives the transmitting signal transmitted from the transmitter 101 by executing the above procedure.

(2-2-2) Operation and Effects of the Embodiment

In the above construction, in the case of communicating between the transmitter 101 and the receiver 102, the transmitter 101 transmits the initial synchronizing signal that the transmission data is "0", and then actually transmits the transmission data. The transmitter 101 firstly spreads the transmission data using the first PN code of "k" chips each to obtain the first spreading data. Then, the transmitter 101 uses the second PN code in which one chip is outputted for each "k" chips of the first PN code, to invert or non-invert the first spreading data for each "k" chips of the first PN code, and obtain the second spreading data. The transmitter 101 performs the modulation such as the phase modulation on the predetermined carrier wave by using thus obtained second spreading data, and transmits the obtained transmitting signal with the predetermined frequency via the transmission RF part 80 and the antenna 81.

In the receiver 102, the reception timing controlling part 104 controls the operation timing of respective parts to receive the transmitting signal outputted from the transmitter 101. The receiver 102 firstly obtains the receiving signal via the antenna 83 and the reception RF part 84. Then, the receiver 102 demodulates the receiving signal that is performed the modulation such as the phase modulation at the information demodulating part 85, to obtain the information demodulation data. The inverse-spreading is performed on the information demodulation data at the spread demodulating part 103 to obtain th e reception data.

In the receiver 102, the first PN code generated at the PN generator 89 is multiplexed with the information demodulation data, so that t he inverse-spread is performed on the information demodulation data to obtain the inverse-spreading data. Then, in the receiver 102, the inverse-spreading data is integrated for each "k" chips of the first PN code and to decide the correlation between the first PN code in the receiving signal and the first PN code generated at the PN generator 89 by the correlation unit 92 in accordance with the integrated result. The PN code generating timing of the PN generator 89 is adjusted based on the decided result to synchronize the first PN code in the receiver 102.

Further, in the receiver 102, "0" or "1" of the second PN code contained in the receiving signal is decided at the deciding part 91 in accordance with the integrated result of the integrator 90 to obtain the third PN code. In this case, the deciding part 91 detects the inversion or non-inversion of the first PN code in the receiving signal from the integrated result, so as to decide "0" or "1" of the second PN code.

Then, in the receiver 102, the third PN code is multiplied by the second PN code generated at the PN generator 94 to integrate the calculated result for each "n" chips. Based on the obtained integrated result, the correlation between the third PN code and the second PN code generated at the PN generator 94 by the correlation unit 107 is decided.

As the result of the decision, if it is decided that they are not synchronized with each other, the timing of the generating PN code of the PN generator 94 is controlled so as to be synchronized with the second PN code. If it is detected that they are synchronized with each other, the reception data is demodulated in accordance with the integrated result of the integrator 105 by the deciding part 106 after the termination of the initial synchronizing signal.

In this way, in the spread spectrum communication system 100, the first PN code is inversed or non-inversed in accordance with the second PN code to transmit them, and the synchronization of the first PN code is detected at a reception side. At the same time, the third PN code in which the second PN code is estimated by detecting the inversion or non-inversion of the first PN code is produced, and the synchronization of the second PN code is detected by the correlation between the second PN code generated at a reception side and the third PN code. Therefore, the synchronization of the first PN code is detected several times, so that the accuracy of the detection of synchronization can be improved to the conventional case where the synchronization is detected with only one PN code, and the synchronization of the PN code can be detected even if the carrier-to-noise ration C/N is low. Moreover, the boundary of the initial synchronizing signal and data or the boundary of respective bits of data can be decided by the second PN code.

Further, in this embodiment, the synchronization of the second PN code is detected by the correlation unit 107, so that it becomes not necessarily that the synchronization of the second PN code is detected continuously. Therefore, even in the case of a large amount of the difference of frequency or the weak intensity of signal, the synchronization of PN code can be detected for sure. Furthermore, in this embodiment, the comparatively shorter two PN codes are used to simplify the construction entirely.

According to the above construction, the first PN code is inverted or non-inverted at a transmission side in accordance with the second PN code to transmit, and the synchronization of the first PN code is detected at a reception side. At the same time, the third PN code in which the second PN code is estimated by detecting the inversion or non-inversion of the first PN code is produced and the synchronization of the second PN code is detected by the correlation between the third PN code and the second PN code generated at a reception side. Therefore, the synchronization of PN code can be detected surely even if the carrier-to-noise ratio C/N is low, and the boundary of the data can be detected.

(2-3) Fourth Embodiment

In the third embodiment, the receiver 102 using the sliding correlation method has been described, in which with respect to one chip of the information demodulation data outputted from the information demodulating part 85, the PN generator 89 is operated one time, and with respect to one chip of the third PN code outputted from the deciding part 91, the PN generator 94 is operated one time. However, in this embodiment, the receiver using a matched filter will be explained with respect to one chip of the information demodulation data outputted from the information demodulating part 85, in which the PN generator 89 is operated several times, and with respect to one chip of the third PN code outputted from the deciding part 91, in which the PN generator 94 is operated several times.

Figure 18A:
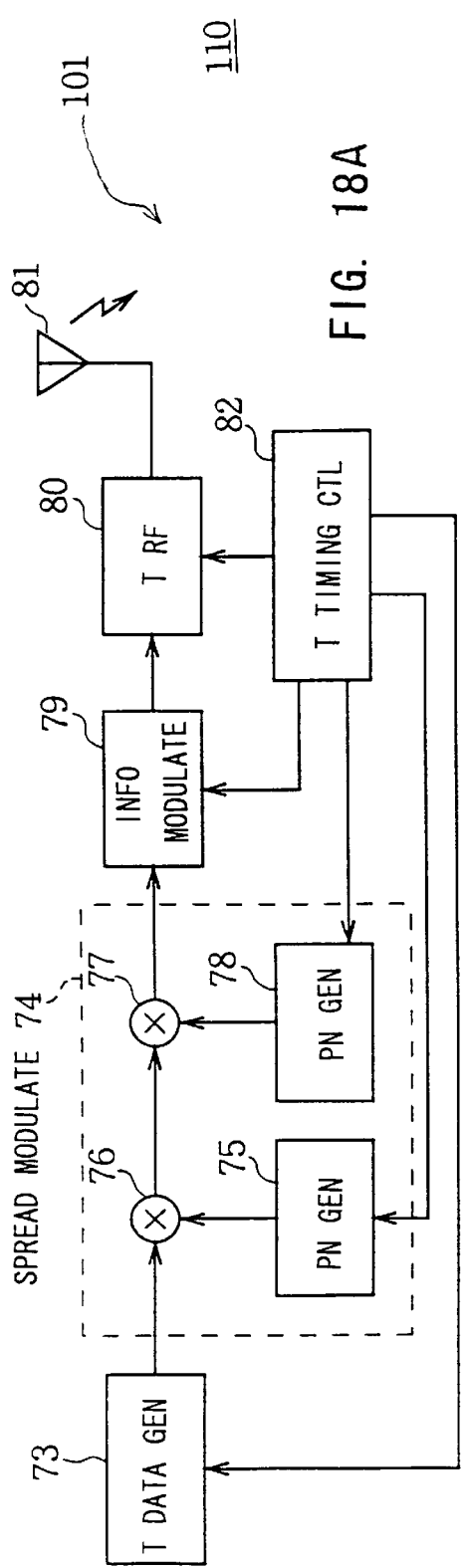
FIG. 18 is a block diagram showing the construction of the spread spectrum communication system of the fourth embodiment.
Figure 18B:
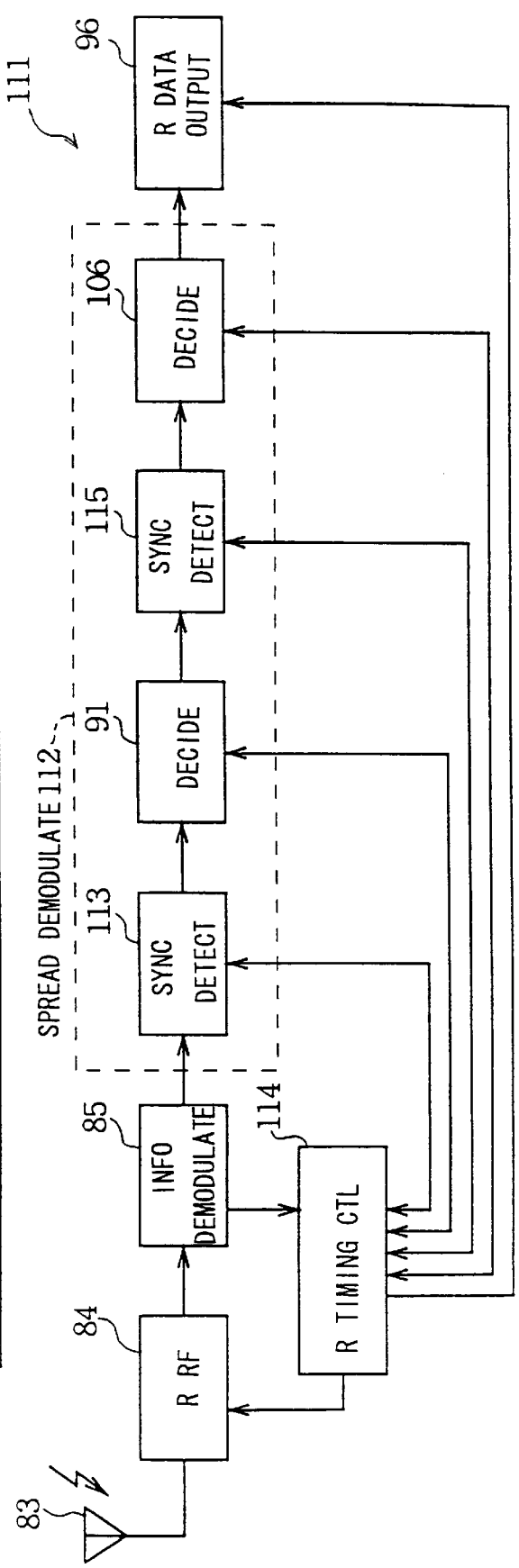

In FIG. 18 in which the portions corresponding to those of FIG. 16 are designated with the same symbols, 110 entirely shows a spread spectrum communication system, which is composed of a transmitter 101 and a receiver 111. In this embodiment, the transmitter 101 has the same construction and operation as that of the third embodiment.

Meanwhile, in the receiver 111, the information demodulation data obtained via the antenna 83, the reception RF part 84, and the information demodulating part 85 is inputted to a spread demodulating part 112 where the inverse-spreading is performed on the information demodulating data. In the spread demodulating part 112, the information demodulation data outputted from the information demodulating part 85 is firstly inputted to a synchronization detecting part 113. The synchronization detecting part 113 which is composed of a matched filter operates based on the operation timing from a reception timing controlling part 114 to synchronize the first PN code generated inside with a transmission side, and performs the inverse-spreading on the information demodulation data by using the first PN code which is synchronous. The synchronization detecting part 113 integrates the data obtained by inverse-spreading to output the integrated result to the deciding part 91, and output the synchronization detected result of the first PN code to the reception timing controlling part 114.

The deciding part 91 operates in accordance with the instruction from the reception timing controlling part 114 to decide the "0" or "1" of the second PN code generated a t a transmission side by comparing the inputted integrated result with the predetermined threshold value, and to output the decided result to a synchronization detecting part 115 as a third PN code.

The synchronization detecting part 115 which is composed of a matched filter operates based on the operation timing from the reception timing controlling part 114 to synchronize the second PN code generated inside with a transmission side, and to perform the inverse-spreading on the third PN code by using the second PN code which is synchronous. Then, the synchronization detecting part 115 integrates the data obtained by inverse-spreading to output the integrated result to the deciding part 106, and outputs the synchronization detected result of the second PN code to the reception timing controlling part 114.

The deciding part 106 which operates based on the instruction from the reception timing controlling part 114, compares the integrated result with the predetermined threshold value after the termination of the initial synchronization signal so as to decide "0" or "1" of the transmission data generated by the transmission data generating part 73. The decided result is outputted to the reception data outputting part 96 as a reception data.

In this way, in the receiver 111, the synchronization of the first and second PN codes are detected by using the synchronization detecting parts 113, 115 which are composed of matched filters, and the transmitting signal is received to obtain the reception data.

Figure 19:
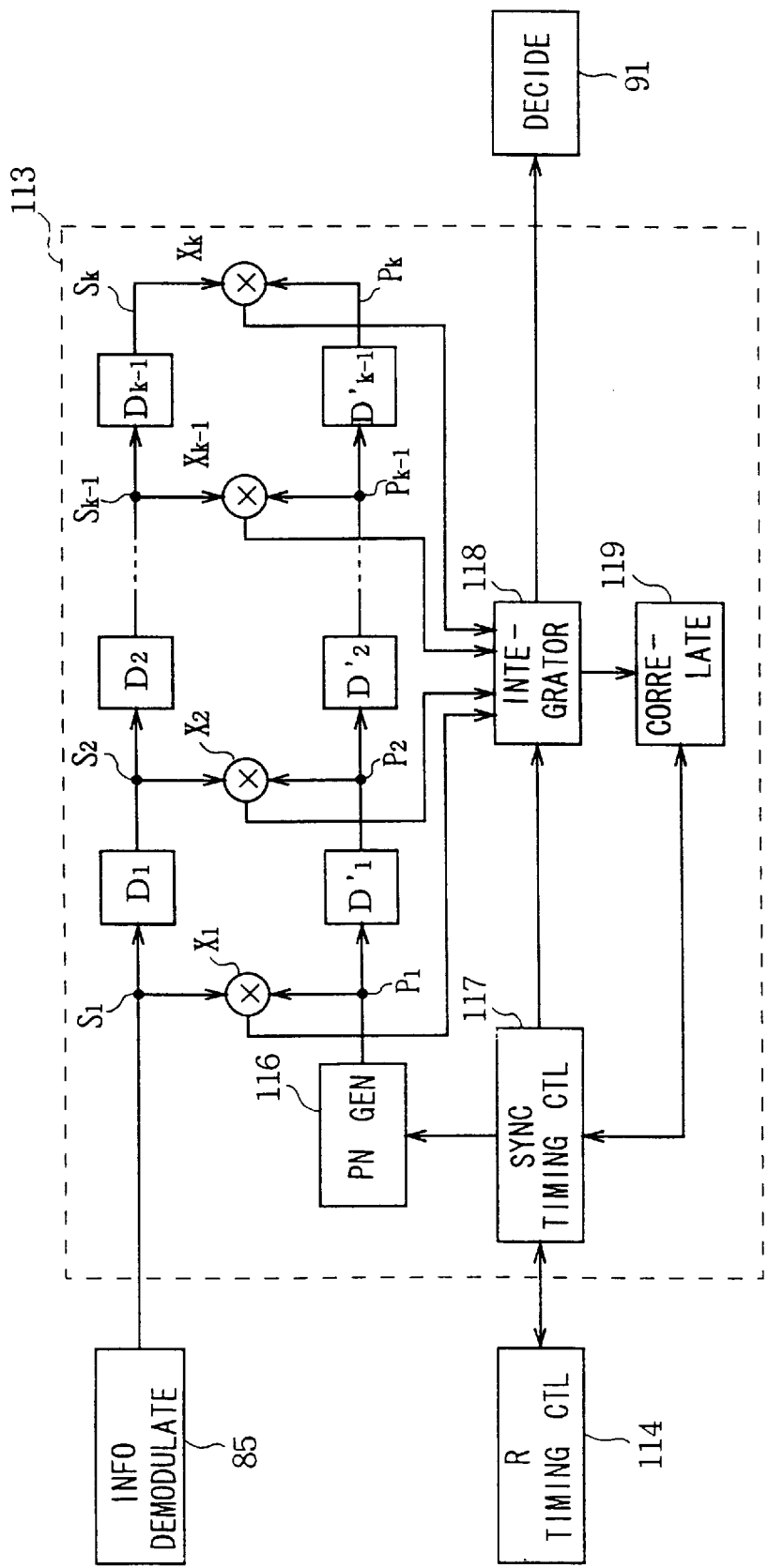
FIG. 19 is a block diagram showing the construction of the synchronization detecting part.

The synchronization detecting part 113, as shown in FIG. 19, is composed of signal delay units $D_1$ to $D_{k-1}$, multipliers $X_1$ to $X_k$, PN delay units $D'_1$ to $D'_{k-1}$, a PN generator 116, a synchronous timing controlling part 117, an integrator 118, and a correlation unit 119.

The information modulation data $S_1$ outputted from the information demodulating part 85 is inputted to the signal delay unit $D_1$ where it is delayed for one chip, thereafter inputted to the signal delay unit $D_2$ as a information demodulation data $S_2$. The signal delay unit $D_2$ delays the information demodulation data $S_2$ for one chip, and outputs it to a signal delay unit $D_3$ (not shown) as an information demodulation data $S_3$. In the similar way, the signal delay unit $D_{k-1}$ delays the inputted information demodulation data $S_{k-1}$ for one chip and outputs it as an information demodulation data $S_k$. In this case, the respective signal delay units $D_1$ to $D_{k-1}$ delay the data for one chip, so that the information demodulation data $S_1$ to $S_k$ become the data for "k" chips. The thus obtained information demodulation data $S_1$ to $S_k$ are respectively inputted to the multipliers $X_1$ to $X_k$.

While, the first PN code $P_1$ generated at the PN generator 116 is inputted to the PN delay unit $D'_1$ where it is delayed for one chip, thereafter, is inputted to the PN delay unit $D'_2$ as a first PN code $P_2$. The PN delay unit $D'_2$ delays the first PN code $P_2$ for one chip and outputs it to the PN delay unit $D'_3$ (not shown) as a first PN code $P_3$. In the similar way, the PN delay unit $D'_{k-1}$ delays the inputted first PN code $P_{k-1}$ for one chip, and outputs it as a first PN code $P_k$. In this case, respective PN delay units $D'_1$ to $D'_{k-1}$ delay the data for one chip, so that the first PN codes $P_1$ to $P_k$ become the first PN code for "k" chips. The thus obtained first PN codes $P_1$ to $P_k$ are respectively inputted to the multipliers $X_1$ to $X_k$.

The multiplier $X_1$ multiplies (that is, exclusive OR calculation) the inputted information demodulation data $S_1$ by the first PN code $P_1$, and the calculated result is outputted to an integrator 118. Further, the multiplier $X_2$ multiplies the inputted information demodulation data $S_2$ by the first PN code $P_2$, and the calculated result is outputted to the integrator 118. Similarly, the multiplier $X_k$ multiplies the inputted information demodulation data $S_k$ by the first PN code $P_k$, the calculated result is outputted to the integrator 118.

The integrator 118 sums up each calculated result outputted from the multipliers $X_1$ to $X_k$ to integrate it, and outputs the integrated result to the deciding part 91 and a correlation unit 119. The correlation unit 119 calculates the signal intensity based on the integrated result outputted from the integrator 118 and compares the signal intensity with the predetermined threshold value, to decide whether or not the first PN code in the information demodulation data $S_1$ to $S_k$ is synchronized with the first PN codes $P_1$ to $P_k$. The decided result is outputted to the synchronous timing controlling part 117.

The synchronous timing controlling part 117 instructs about the operation timing to the PN generator 116, the signal delay units $D_1$ to $D_{k-1}$, the PN delay units $D'_1$ to $D'_{k-1}$, the integrator 118, and the correlation unit 119, in accordance with the operation timing outputted from the reception timing controlling part 114. Further, the synchronization timing controlling part 117 outputs the synchronization detected result of the first PN code which is detected by the correlation unit 119 to the reception timing controlling part 114.

In this case, the operation timing is controlled by the synchronous timing controlling part 117, so that the PN generator 116 and the PN delay unit $D'_1$ to $D'_{k-1}$ are operated for one period of the first PN code at its maximum while the signal delay units $D_1$ to $D_{k-1}$ are operated once, and the first PN code $P_1$ to $P_k$ which are synchronous with the current information demodulation data $S_1$ to $S_k$ can be found with a high speed. Further, once detecting the synchronization allows to continuously detect the synchronization if the PN generator 116 and the PN delay unit $D'_1$ to $D'_{k-1}$ are operated one time whenever the signal delay unit $D_1$ to $D_{k-1}$ are operated one time. At this time, it is determined by the setting of the synchronous timing controlling part 117 that whether or not the synchronization is made to be detected many times.

In connection, the construction of the synchronous detecting part 115 is realized by the following performances. In the construction of the synchronous detecting part 113 shown in FIG. 19, the second PN code is generated at the PN generator 116, the number of the signal delay units $D_1$ to $D_{k-1}$ and the PN delay units $D'_1$ to $D'_{k-1}$ are changed to "n−1", and the number of the multipliers $X_1$ to $X_k$ is changed to "n".

According to the above construction, the synchronization detecting parts 113, 115 composed of the matched filters are provided, so as to detect the synchronization of the first and second PN code more speedy than the speed of the receiving signal.

(2-4) Examples of Transformation (2-4-1) First Example of Transformation

The second to fourth embodiments discussed above have dealt with the case where the unit of the transmission data generated at the transmission data generating part 73 is represented by a bit. However, this invention is not only limited to this, but if the processing such as the convolutional coding processing is performed at the transmission data generating part 73, the same effect as the above embodiment can be obtained even when a symbol is used as the unit instead of a bit.

(2-4-2) Second Example of Transformation

Further, the second to fourth embodiments discussed above have been dealt with the case where the first PN code is spread at the transmitters 71, 101 preceding the second PN code. However, this invention is not only limited to this, but if the order of spreading of the first and second PN codes is switched, the same effects as the above case can be obtained.

(2-4-3) Third Example of Transformation

Further, the second to third embodiments discussed above have dealt with the case where the PN generators 89, 94, the multipliers 88, 93, and the integrators 90, 105 provided on the spread demodulating parts 87, 103 are used not only for demodulating the receiving signal but also for the detection of synchronization, so that the circuit scale is reduced.

However, this invention is not only limited to this but, the same effects as the above case can be obtained and the entirely high speed operation can obtained, even if the PN generator, multiplier, and integrator which operates separately from the spread demodulating parts 87, 103 as the synchronous detecting means are provided in parallel to the spread demodulating parts 87, 103.

(2-4-4) Fourth Example of Transformation

The second to fourth embodiments discussed above have dealt with the case where the initial synchronizing signal for one period of the second PN code is transmitted. However, this invention is not only limited to this, but the same effects as the above case can be obtained, even when the initial synchronizing signal having the length which is about one period of the second PN code or the initial synchronizing signal constituting of a part of the second PN code is transmitted.

(2-4-5) Fifth Example of Transformation

Further, the third and fourth embodiments discussed above have dealt with the case where the number of chip "k" is the length of period of the first PN code, the number of chip "n" is the length of period of the second PN code, and the transmission data for one bit is spread to (k×n) chips. However, this invention is not only limited to this, but the same effects as the above case can be obtained, even when the number of chip "k" is close to the value of one period of the first PN code or becomes a part of the first PN code, or the number of chip "n" is close to the value of one period of the second PN code or becomes a part of the second PN code.

(2-4-6) Sixth Example of Transformation

Further, the third and fourth embodiments discussed above have dealt with the case where two PN codes (that is, the first and second PN codes) are used as the spread code of transmission data. However, this invention is not limited to this, but the same effects as the above case can be obtained, even if the PN codes more than three are used to perform spreading as a spread code and the same PN codes more than three are used to perform inverse-spreading.

The example of transformation using the PN code more than three as a spread code will be described below, applying to the third embodiment described above. Here, "y" is an integer more than two, and "x" is any integer of 2≦x≦y.

First, in the transmitter 101, a (x+1)-th PN generator which generates a (x+1)-th PN code is added for each x-th regular period of a x-th PN code, and the transmission data is spread by the spreading means (concretely, multiplier) using a first to (x+1)-th PN codes.

Meanwhile, in the receiver 102, the (x+1)-th PN generator which generates the (x+1)-th PN code is added for each x-th regular period of the x-th PN code. Further, the (x+1)-th correlation unit which detects the correlation between the x-th inverse-spreading data obtained by inverse-spreading and the (x+1)-th PN code to output the (x+1)-th synchronous timing is added. Furthermore, the (x+1)-th inverse-spreading means (concretely, multiplier and integrator) for inverse-spreading the x-th inverse-spreading data by using the (x+1)-th PN code and outputting the (x+1)-th inverse-spreading data in accordance with the (x+1)-th synchronous timing, is added. In this way, in the receiver 102, the (x+1)-th PN generator, the (x+1)-th correlation unit and the (x+1)-th inverse-spreading means are added so that the signal, which is spread by using the PN code more than three, can be inverse-spread.

(2-4-7) Seventh Example of Transformation

Further, the third and fourth embodiments discussed above have dealt with the case where the transmission data is spread by using the first and second PN code also after the termination of the initial synchronizing signal similarly. However, this invention is not limited to this, but the spreading using the second PN code can be stopped after the termination of the initial synchronizing signal. Therefore, the synchronization can be obtained easily by using the PN code of multistage when obtaining the initial synchronization. And simultaneously after the initial synchronization, the number of stage of PN code is reduced to improve the bit rate with the same chip rate, and both obtaining the synchronization and the high bit rate are compatible.

Figure 20:
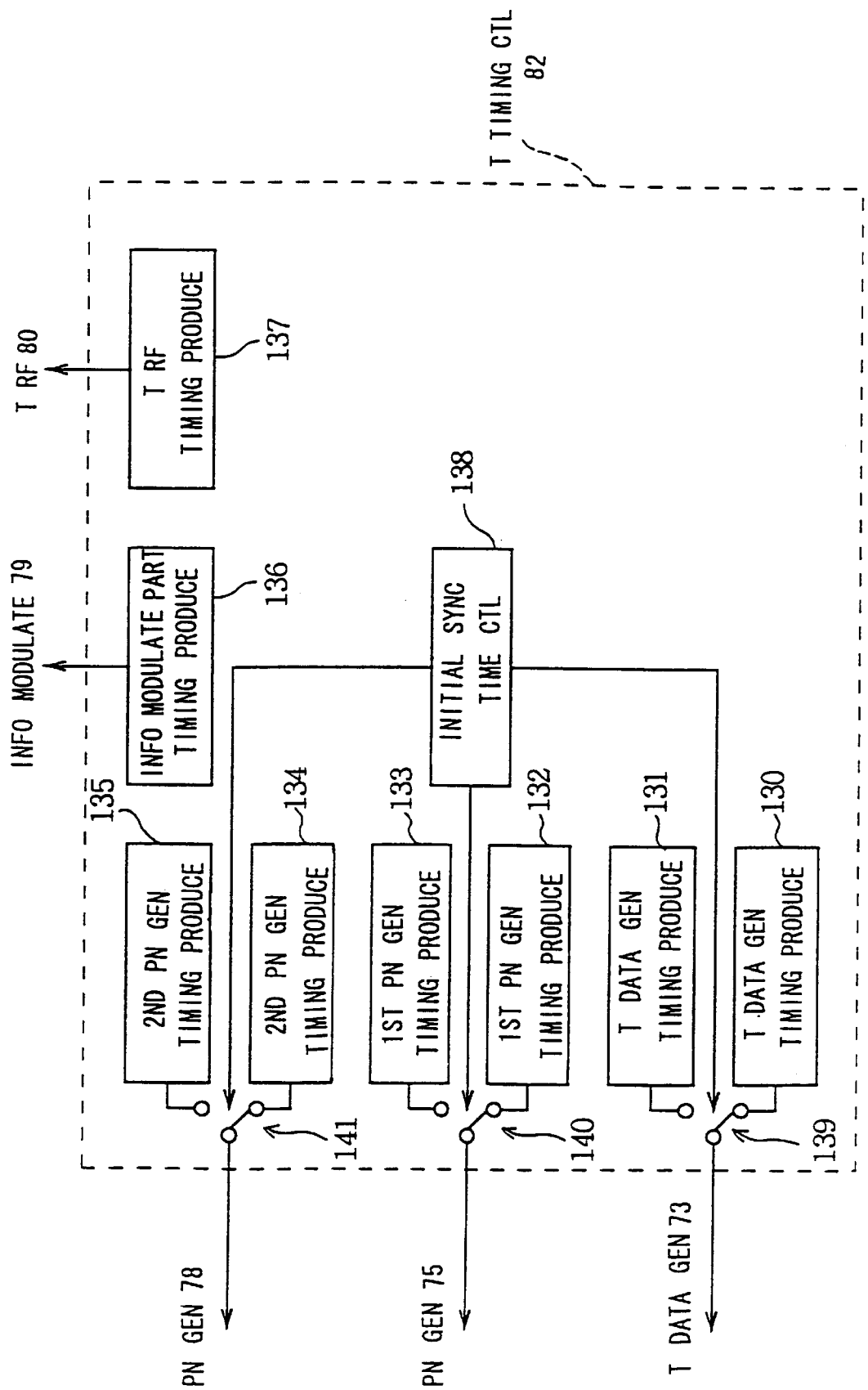
FIG. 20 is a block diagram showing the construction of the transmission timing controlling part in the examples of transformation.

More specifically, the transmission timing controlling part 82 is constructed as shown in FIG. 20, and the timing control of the transmission data generating part 73 and the PN generators 75, 78 is enabled to change.

Here, the transmission data generation timing producing parts 130, 131 produce the output timing of transmission data to be outputted to the transmission data generating part 73 respectively. The first PN generation timing producing parts 132, 133 produce the output timing of the first PN code to be outputted to the PN generator 75 respectively. The second PN generation timing producing parts 134, 135 produce the output timing of the second PN code to be outputted to the PN generator 78 respectively. The information modulating part timing producing part 136 produces the modulation timing of the information modulating part 79 for the output of the multiplier 77. The transmission RF part timing producing part 137 produces the transmission timing, etc. for the transmission RF part 80.

Further, the initial synchronization time controlling part 138 instructs to change, only during the initial synchronization, each timing for outputting to the transmission data generating part 73 and the PN generators 75, 78. The switches 139 to 141 are switched by the initial synchronization time controlling part 138.

In this case, during the initial synchronization time, the transmission data generation timing producing part 130 is switched to connect to the transmission data generating part 73, the first PN generation timing producing part 132 is switched to connect to the PN generator 75, and the second PN generation timing producing part 134 is switched to connect to the PN generator 78. On the contrary, after the initial synchronization time, the transmission data generation timing producing part 131 is switched to connect to the transmission data generating part 73, the first PN generation timing producing part 133 to the PN generator 75, and the second PN generation timing producing part 135 to the PN generator 78, respectively.

After the termination of the initial synchronizing signal, to stop the spreading by using the second PN code, the construction is used in which the second PN generation timing producing part 135 does not generate any timing signal, but outputs the fixed signal. Therefore, the generation timing of the first and second PN codes is switched so that, after the termination of the initial synchronizing signal, the spreading by using the second PN code is stopped to improve the bit rate for the chip rate.

Figure 21:
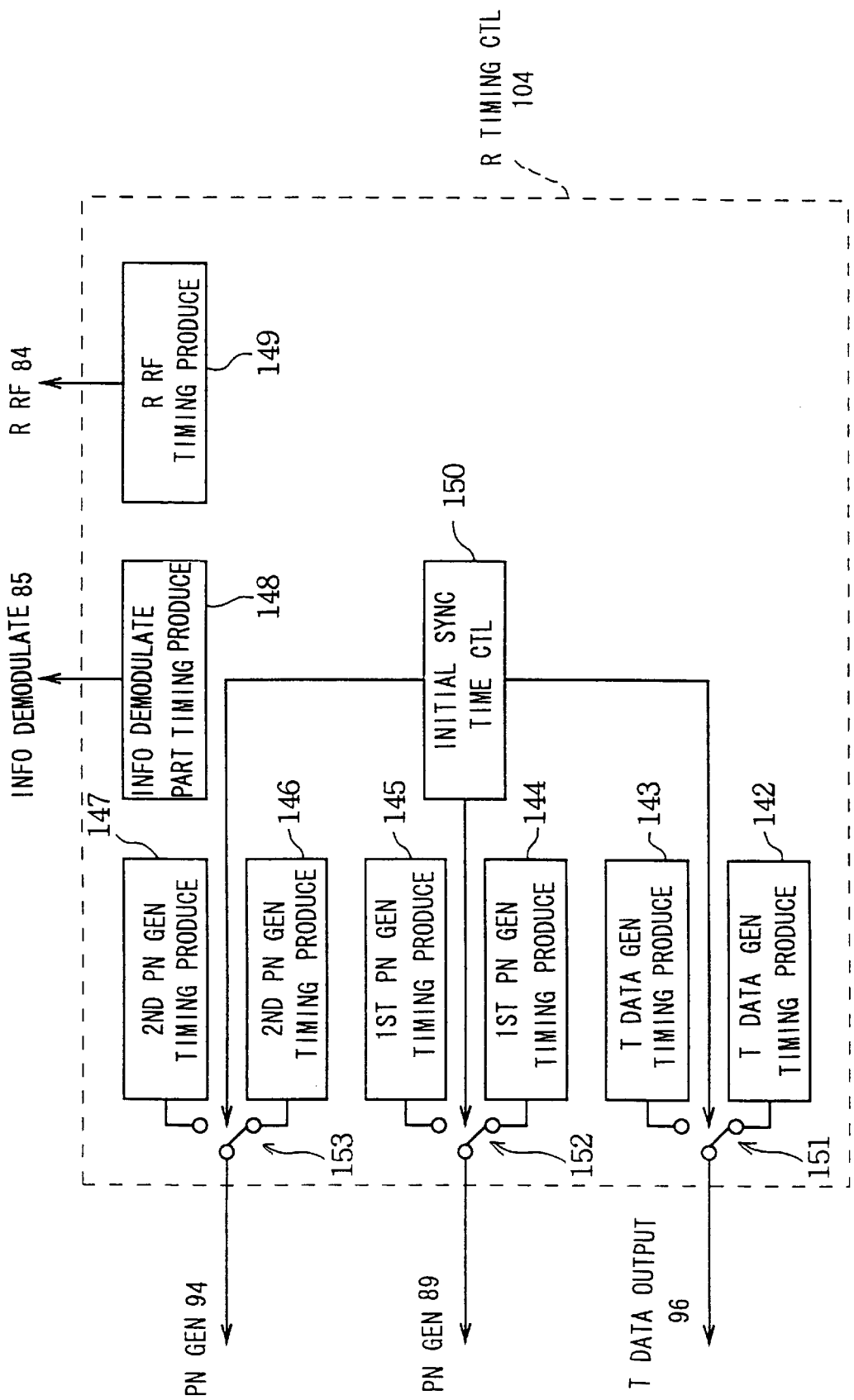
FIG. 21 is a block diagram showing the construction of the reception timing controlling part in the examples of transformation.

In that connection, in the case where the transmission timing controlling part 82 is constructed as shown in FIG. 20, the reception side is constructed so as to correspond to this construction, and the reception timing controlling part 104 (or 114) having the construction as shown in FIG. 21 is provided. In FIG. 21, the output timing to the integrators 90, 105, the correlation units 92, 107, and deciding parts 91, 106 are omitted, and the timing after the initial synchronization time are changed from the timing during the initial synchronization time.

Further, as the sixth example of transformation described above, when the PN generators exist more than three, one or two PN generators are stopped after the initial synchronization time, so as to improve the bit rate. If two PN generators are stopped, it can be considered that they are not only stopped at the same time after the initial synchronization time, but also stopped at a different time.

(2-4-8) Eighth Example of Transformation

Further, the third and fourth embodiments discussed above have dealt with the case where the transmission data is spread by using the first and second PN codes after the initial synchronizing signal similarly. However, this invention is not only limited to this, but after the termination of the initial synchronizing signal, the number of the generation chip (that is, the spread rate of PN code) of the PN code to the transmission data can be reduced. In this case, using the transmission timing controlling part 82 shown in FIG. 20 and the reception timing controlling part 104 shown in FIG. 21, the generation timing of PN code is switched.

(2-4-9) Ninth Example of Transformation

Figure 22:
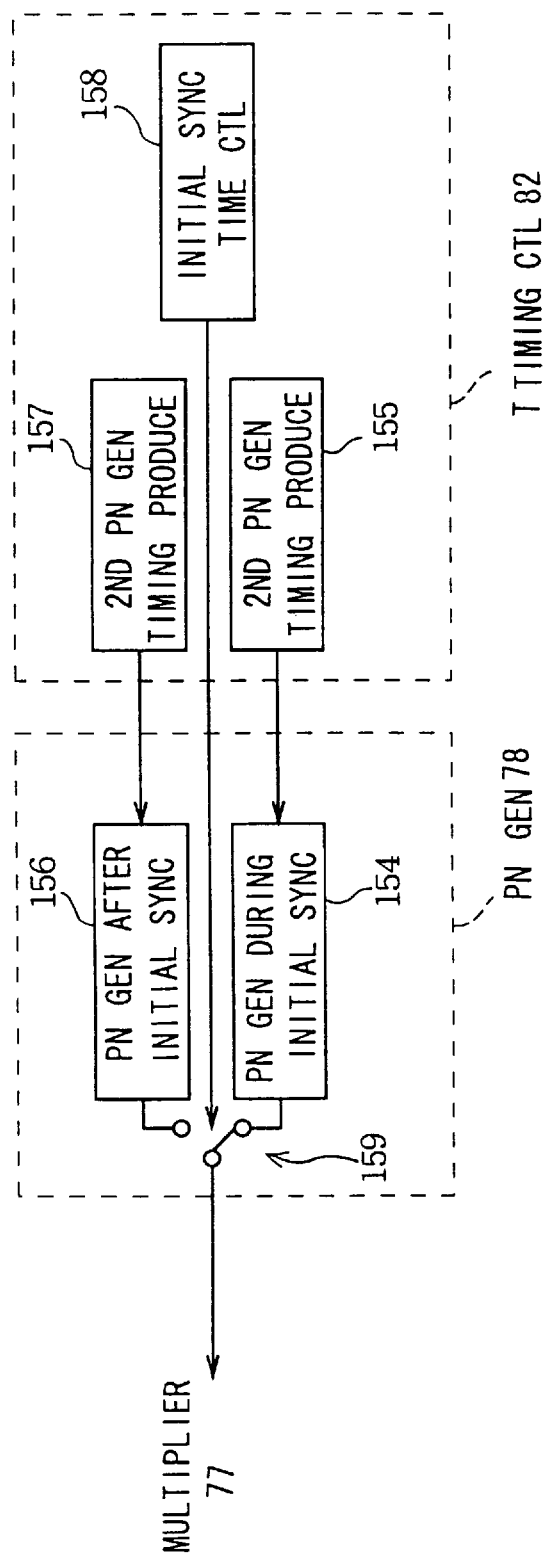
FIG. 22 is a block diagram showing the construction of the PN generator and the transmission timing controlling part in the examples of transformation.

Further, the third and fourth embodiments discussed above have dealt with the case where the transmission data is spread by using the first and second PN codes after the termination of the initial synchronizing signal. However, this invention is not only limited to this, but after the termination of the initial synchronizing signal, the sequence of PN code itself can be changed. In this case, the construction of the PN generator 78 and the transmission timing controlling part 82 at a transmission side can be changed into the construction shown in FIG. 22.

A PN generating part 154 used during the initial synchronization receives the timing signal outputted from a second PN generation timing producing part 155 to generate the second PN code used during the initial synchronization. A PN generating part 156 used after the initial synchronization receives the timing signal outputted from a second PN generation timing producing part 157 to generate the second PN code used after the initial synchronization. An initial synchronization time controlling part 158 switches, during the initial synchronization time, a switch 159 so that the second PN code outputted from the PN generating part used during the initial synchronization is supplied to the multiplier 77. Moreover, the initial synchronization time controlling part 158 switches, after the initial synchronization time, the switch 159 so that the second PN code outputted from the PN generating part 156 used after the initial synchronizing is supplied to the multiplier 77.

Figure 23:
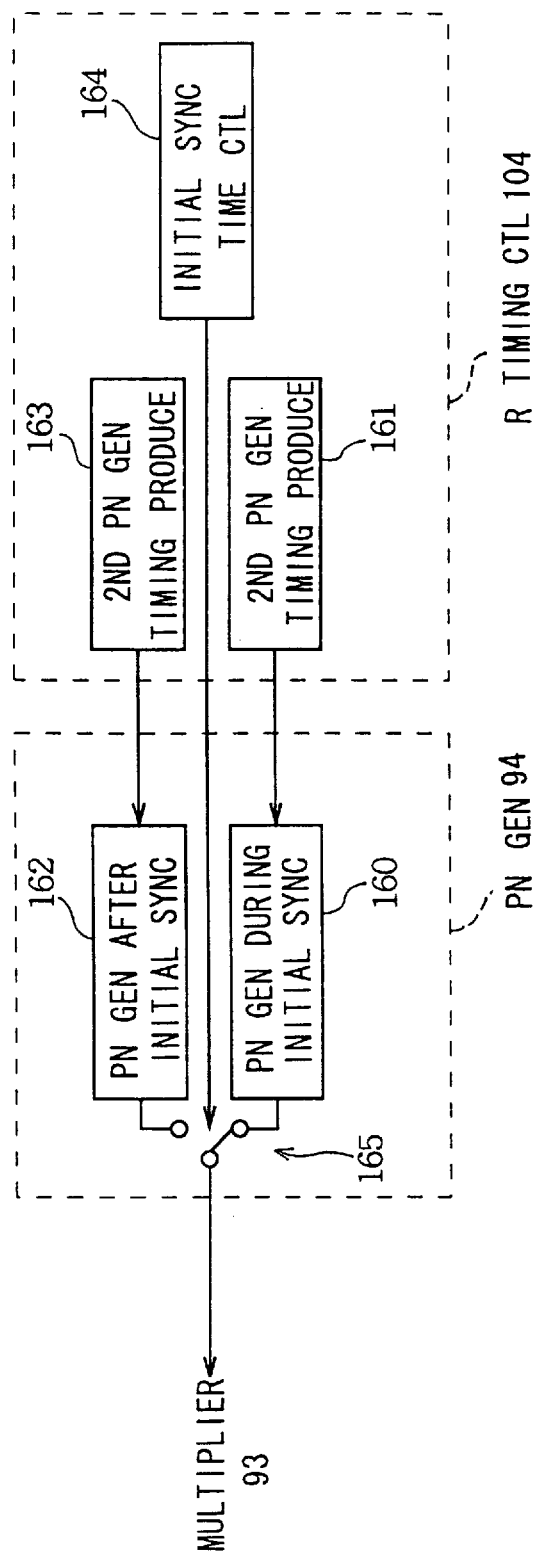
FIG. 23 is a block diagram showing the construction of the PN generator and the reception timing controlling part in the examples of transformation.

In the same way, the construction of the PN generator 94 and the reception timing controlling part 104 (or 114) at a reception side can be changed as shown in FIG. 23.

In this way, in the case where the PN code itself is switched between the initial synchronization time and after that time, one period of PN code having the long period is used in the initial synchronization time and one period of PN code having the short period is used after the initial synchronization time. Therefore, the synchronization can be easily obtained by obtaining enough spread gain with a large spread rate during the initial synchronization, and the moderate spread gain can be obtained with a small spread rate after the initial synchronization to improve the bit rate.

While there has been described in connection with the preferred embodiments of the invention, it will be obvious to those skilled in the art that various changes and modifications may be made, therefore, to cover in the appended claims all such changes and modifications as fall within the true spirit and scope of the invention.

What is claimed is:

1. In a spread communication system having a transmitter and a receiver and communicating by a spread spectrum communication method between said transmitter and said receiver, said transmitter comprising:

means for producing a first type of spread code and a second type of spread code;

selection means connected to said means for producing for continually selecting between said first type of spread code and said second type of spread code according to a predetermined transmission pattern; and transmitting means for transmitting said first type of spread code and said second type of spread code from said selection means as a synchronizing signal in accordance with said predetermined transmission pattern, wherein said means for producing includes means producing said first type of spread code and said second type of spread code consisting of one type of PN code and an inverse of said one type of PN code.

2. In a spread communication system having a transmitter and a receiver and communicating by a spread spectrum communication method between said transmitter and said receiver, said transmitter comprising:

means for producing a first type of spread code and a second type of spread code;

selection means connected to said means for producing for continually selecting between said first type of spread code and said second type of spread code mm according to a predetermined transmission pattern; and transmitting means for transmitting said first type of spread code and said second type of spread code from said selection means as a synchronizing signal in accordance with said predetermined transmission pattern, wherein said transmitting means includes means for transmitting said first type of spread code and said second type of spread code a total of $(2^N+N-2)$ times at a maximum in accordance with an M sequence code of degree N used as said predetermined transmission pattern.

3. In a spread communication system having a transmitter and a receiver and communicating by a spread spectrum communication method between said transmitter and said receiver, said transmitter comprising:

means for producing a first type of spread code and a second type of spread code;

selection means connected to said means for producing for continually selecting between said first type of spread code and said second type of spread code according to a predetermined transmission pattern; and transmitting means for transmitting said first type of spread code and said second type of spread code from said selection means as a synchronizing signal in accordance with said predetermined transmission pattern, wherein said transmitting means include means for adding and inserting a code having a value that is equal to "0" into an M sequence code of degree N having a sequence of "0" for (N−1) times and is used as said predetermined transmission pattern, and means for transmitting said first type of spread code and said second type of spread code a total of $(2^N+N-1)$ times at a maximum in accordance with said code having a value that is equal to "0" added and inserted into said M sequence code.

4. In a spread spectrum communication system having a transmitter and a receiver communicating by a spread spectrum communication method, said receiver comprising:
code detecting means for respectively detecting a first type of spread code and a second type of spread code arranged in a continuous predetermined transmission pattern in the form of a reception synchronizing signal, and
pattern detecting means for detecting said predetermined transmission pattern formed of said first type of spread code and said second type of spread code received from said transmitter based on said detected first type of spread code and said detected second type of spread code.

5. The receiver of the spread spectrum communication system according to claim 4, wherein
in the case where said first type of spread code and said second type of spread code consist of one type of PN code and an inverse of said one type of PN code, said code detecting means includes means for detecting said one type of PN code and said inversion of said one type of PN code to detect said predetermined transmission pattern.

6. The receiver of the spread spectrum communication system according to claim 4, wherein
in the case where the transmitter uses an M sequence code of degree N as said predetermined transmission pattern, and said first type of spread code and said second type of spread code are transmitted in accordance with said M sequence code of degree N,
said code detecting means includes means for detecting the order of said first type of spread code and said second type of spread code for successive N times.

7. The receiver of the spread spectrum communication system according to claim 4, wherein
in the case where the transmitter uses an M sequence code of degree N as said predetermined transmission pattern, and said first type of spread code and said second type of spread code are transmitted in accordance with said M sequence code of degree N,
said code detecting means includes means for detecting the order to said first type and said second type of spread code for successive N times and the order to said first type and said second type of spread code for N times from that for successive (N+1) times.

8. The receiver of the spread spectrum communication system according to claim 4, wherein
in the case where the transmitter uses a code as said predetermined transmission pattern having a value that is equal to "0" added and inserted into said M sequence code of degree N having a sequence of "0" for (N−1) times, and where the transmitter transmits said first type of spread code and said second type of spread code in accordance with said code having a value that is equal to "0" added and inserted into said M sequence code of degree N,
said code detecting means includes means for detecting an order of said first type of spread code and said second type of spread code for successive N times.

9. The receiver of the spread spectrum communication system according to claim 4, wherein in the case where the transmitter uses a code as said predetermined transmission pattern having a value that is equal to "0" added and inserted into an M sequence code of degree N having a sequence of "0" for (N−1) times, and where said transmitting means transmits said first type of spread code and said second type of spread code in accordance with said code having a value that is equal to "0" added and inserted into said M sequence code of degree N,
said code detecting means includes means for detecting an order to said first type of spread code and said second type of spread code for successive N times and an order of said first type of spread code and said second type of spread code for N times for successive (N+1) times.

10. In a spread spectrum communication system having a transmitter and a receiver communicating by a spread spectrum communication method said transmitter comprising:
first spread code generating means for generating a first spread code;
second spread code generating means for generating a second spread code;
transmission timing control means for controlling said first spread code generating means to generate said first spread code for a predetermined period of transmission data fed in for transmission and for controlling said second spread code generating means to generate said second spread code for a predetermined period of said first spread code;
spreading means for spreading said transmission data by using said first spread code generated at said predetermined period of said transmission data and said second spread code generated at said predetermined period of said first spread code to output a spreading signal; and
transmitting means for performing predetermined processing on said spreading signal to transmit it as a transmitting signal.

11. The transmitter of the spread spectrum communication system according to claim 10, further comprising an (x+1)-th spread code generating means, wherein
if "y" is an integer more than "2", and "x" is any integer of 2≦x≦5y,
said (x+1)-th spread code generating means generates an (x+1)-th spread code for each x-th specified time of a x-th spread code; and
said spreading means spreads said transmission data using said spread codes from the first spread code to said (x+1)-th spread code.

12. The transmitter of the spread spectrum communication system according to claim 10, further comprising spread controlling means, wherein
if "z" is a natural number more than "2",
said spread controlling means controls said spreading means so as to spread by using a z-th spread code in a synchronization time, and stops the spreading using said z-th spread code in a time other than said synchronization time.

13. The transmitter of the spread spectrum communication system according to claim 10, wherein said spreading means comprises a z-th spread code generating means, and wherein
if "z" is a natural number,
a first type and a second type of said z-th spread code are generated by said z-th spread code generating means; and further comprising
spread controlling means for controlling spreading so as to spread by using one z-th spread code in a synchronization time, and to stop the spreading by using another z-th spread code in a time other than the synchronization time.

14. The transmitter of the spread spectrum communication system according to claim 13, wherein a spread rate of said z-th spread code by said spreading means is decreased after an initial synchronization time.

15. In a spread spectrum communication system having a transmitter and a receiver communicating by a spread spectrum communication method, said receiver comprising:

receiving means for receiving a transmitting signal, in which transmission data is spread by using a first spread code and second spread code, transmitted from said transmitter and producing a receiving signal therefrom;

first inverse-spread code generating means for generating said first spread code as an inverse-spread code;

second inverse-spread code generating means for generating said second spread code as an inverse-spread code;

first correlation detecting means for detecting a correlation between said first spread code and said receiving signal to output a first synchronous timing signal;

first inverse-spreading means for inverse-spreading said receiving signal by using said first spread code to output a first inverse-spreading signal in accordance with said first synchronous timing signal;

second correlation detecting means for detecting a correlation between said second spread code and said first signal to output a second synchronous timing signal; and second inverse-spreading means for inverse-spreading said first inverse-spreading signal by using said second spread code to output a second inverse-spreading signal in accordance with said second synchronous timing signal.

16. The receiver of the spread spectrum communication system according to claim 15, wherein at least one of said first and said second correlation detecting means consists of a matched filter.

17. The receiver of the spread spectrum communication system according to claim 15, further comprising inverse-spread controlling means for controlling said first inverse-spreading means so as to inverse-spread by using said first spread code in a synchronization time, and to stop the inverse-spreading using said first spread code in a time other than said synchronization time.

18. The receiver of the spread spectrum communication system according to claim 15, wherein the spread rate of said first spread code is decreased after a synchronization time.

19. A transmitter in a spread spectrum communication system communicating by a spread spectrum communication method, said transmitter comprising:

first spread code generating means for generating a first spread code;

second spread code generating means for generating a second spread code;

transmission timing control means for controlling said first spread code generating means to generate said first spread code for a predetermined period of transmission data fed in for transmission and for controlling said second spread code generating means to generate said second spread code for a predetermined period of said first spread code;

spreading means for spreading said transmission data by using said first spread code generated at said predetermined period of said transmission data and said second spread code generated at said predetermined period of said first spread code and for outputting a spreading signal; and transmitting means for performing a predetermined processing on said spreading signal for transmission as a transmitting signal.

20. A receiver in a spread spectrum communication system communicating by a spread spectrum communication method, said receiver comprising:

receiving means for receiving a transmitting signal from a transmission side of said spread spectrum communication system;

first inverse-spread code generating means for generating a first inverse-spread code of a identical to a first spread code of said transmission side;

second inverse-spread code generating means for generating a second inverse-spread code for a first specified time of said first inverse-spread code;

first correlation detecting means for detecting a correlation between said first inverse-spread code and said receiving signal to output a first synchronous timing signal;

first inverse-spreading means for inverse-spreading said receiving signal by using said first inverse-spread code and for outputting a first inverse-spreading signal in accordance with said first synchronous timing signal;

second correlation detecting means for detecting a correlation between said second inverse-spread code and said first inverse-spreading signal, to output a second synchronous timing signal; and second inverse-spreading means for inverse-spreading said first inverse-spreading signal by using said second inverse-spread code and for outputting a second inverse-spreading signal in accordance with said second synchronous timing signal.

* * * * *